United States Patent [19]

Hoch et al.

[11] 4,446,525

[45] May 1, 1984

[54] NUMERICAL CONTROL WITH PARAMACRO CAPABILITY

[75] Inventors: Thomas M. Hoch, Cleveland, Ohio; Dennis R. Kullgren, Holliston, Mass.

[73] Assignee: Allen-Bradley, Milwaukee, Wis.

[21] Appl. No.: 539,231

[22] Filed: Oct. 7, 1983

Related U.S. Application Data

[63] Continuation of Ser. No. 284,528, Jul. 20, 1981.

[51] Int. Cl.³ .................. G05B 19/04; G05B 19/42
[52] U.S. Cl. .................... 364/474; 364/900
[58] Field of Search ............ 364/474, 190, 191, 192, 364/193, 167

[56] References Cited

U.S. PATENT DOCUMENTS

| Re. 31,247 | 5/1983 | Johnstone | 364/474 |
| 3,720,814 | 3/1973 | Klein | 318/569 |
| 3,857,025 | 12/1974 | English et al. | 364/193 |
| 4,021,651 | 5/1977 | Mitsuhashi et al. | 364/193 |
| 4,104,976 | 8/1978 | Landau, Jr. et al. | 364/191 |
| 4,118,776 | 10/1978 | Isomura | 364/474 |
| 4,228,495 | 10/1980 | Bernhard et al. | 364/474 |
| 4,229,804 | 10/1980 | Kobayashi et al. | 364/474 |
| 4,328,550 | 5/1982 | Weber | 364/474 |
| 4,335,436 | 6/1982 | Inoue | 364/474 |
| 4,356,552 | 10/1982 | Imazeki et al. | 364/474 |
| 4,363,090 | 12/1982 | Garcia | 364/192 |

OTHER PUBLICATIONS

System Programming, John Donovan, 1972, p. 44 McGraw-Hill Computer Science Series.
A 1978 article from *Siemens Review* entitled "Sinumerik System 7-A CNC System With Microprocessor" by Klaus-Rudiger Hoffman and Siegfried Strembski, pp. 147-153.
A 1978 article from *Siemens Review* entitled "Sinumerik 530C-A Computerized Numerical Control System for Punching and Nibbling Machines" by Gunter Bromer and Wolfgang Jehle, pp. 154-156.

*Primary Examiner*—Charles E. Atkinson
*Assistant Examiner*—Jameson Lee
*Attorney, Agent, or Firm*—Barry E. Sammons

[57] ABSTRACT

A numerical control system executes part programs which contain parameters and arithmetic expressions containing parameters. A parameter table containing parameter values is employed to evaluate parameters and arithmetic expressions during the execution of a part program, and means is provided which enables parameter values to be changed by part program instructions or manual data entry. Macroprograms, such as canned cycles, are stored in the numerical control system in a generalized form in which their instructions contain parameters and arithmetic expressions in lieu of constants. Prior to calling such a macroprogram, the part program assigns suitable values to the parameters employed in the macroprogram.

6 Claims, 28 Drawing Figures

| NAME | DESCRIPTION | VALUE | UNIT |
|---|---|---|---|
| P26 | HOLE DEGREE'S (THETA) | 30.00 | DEGREE |
| P49 | RADIUS (R-WORD) | 100.0000 | INCHES |
| P32 | #OF HOLES (TH/360) | 12.00000 | INTGR. |
| P10 | HOLES COMPLETED | 2.0 | INTGR. |
| P13 | R*COS (BETA) | 84.38456 | INCHES |
| P14 | R*SIN (BETA) | 36.89672 | INCHES |
| P29 | BETA, TH+(P12**TH) | 120.0000 | DEGREE |

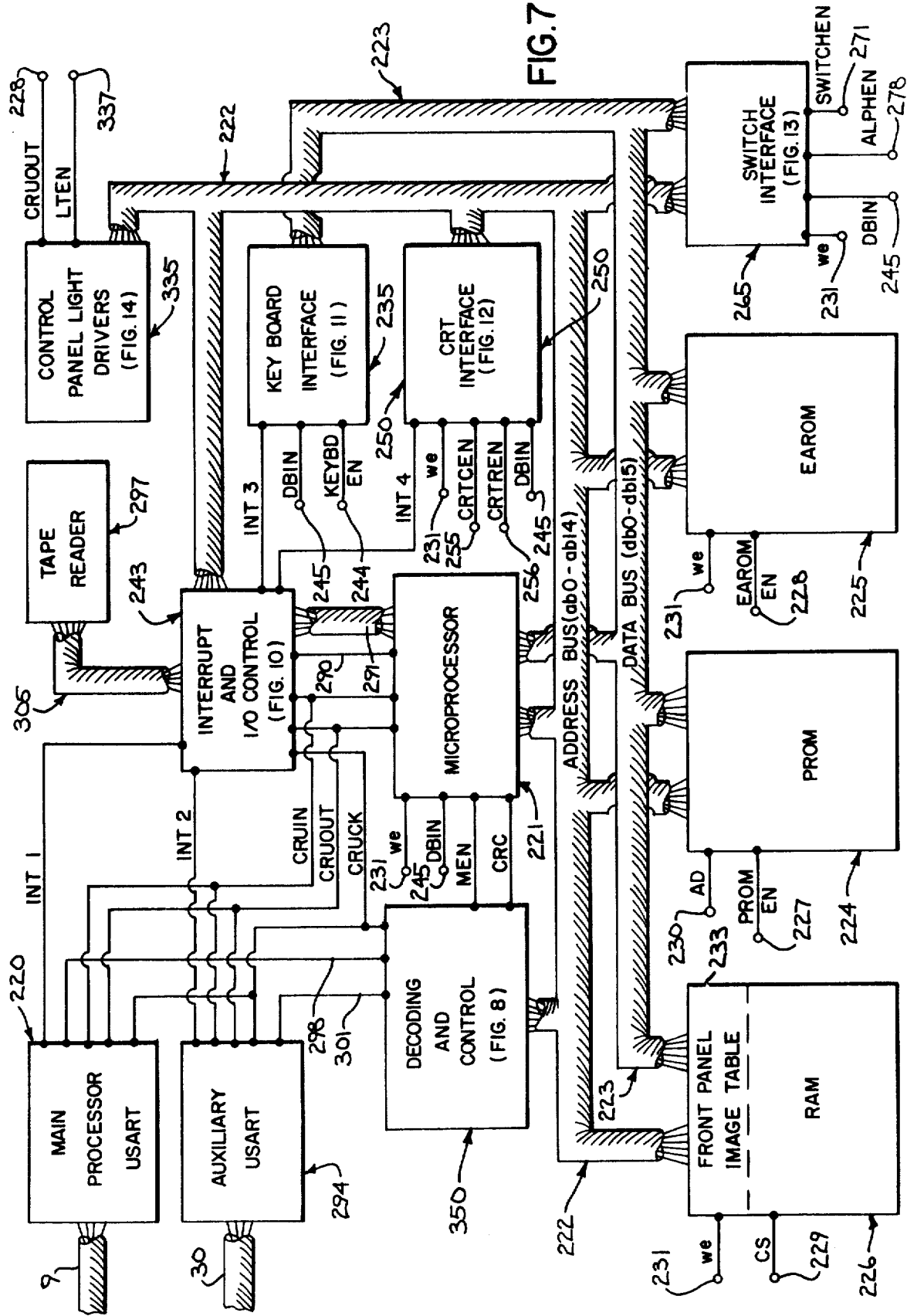

| NAME | DESCRIPTION | VALUE | UNIT |
|------|-------------|-------|------|
| P26 | HOLE DEGREE'S (THETA) | 30.00 | DEGREE |
| P49 | RADIUS (R-WORD) | 100.0000 | INCHES |
| P32 | #OF HOLES (TH/360) | 12.00000 | INTGR. |
| P10 | HOLES COMPLETED | 2.0 | INTGR. |
| P13 | R*COS (BETA) | 84.38456 | INCHES |
| P14 | R*SIN (BETA) | 36.89672 | INCHES |
| P29 | BETA, TH+(P12**TH) | 120.0000 | DEGREE |

SCHEDULE QUEUE

| PCB MEMORY ADDRESS | ALLOCATED TIME SLICES |
|---|---|
| A(PCB1) | MSC1 = 32 |
| A(PCB2) | MSC2 = 32 |
| A(PCB3) | MSC3 = 3 |
| A(PCB4) | MSC4 = 1 |
| A(PCB5) | MSC5 = 1 |
| A(PCB6) | MSC6 = 1 |
| A(PCB7) | MSC7 = 2 |

368

PROCESS CONTROL BLOCK

| IOW | CIW | PRW | |
|---|---|---|---|
| CURRENT TIME SLICES REMAINING | | | (CSC) |
| MEMORY EXTENSION REG. CONTENTS | | | (MXR) |
| WORKSPACE POINTER | | | (WP) |
| PROGRAM COUNTER | | | (PC) |
| PROGRAM STATUS | | | (ST) |

SCHEDULER

BLOCK SETUP PROCESS

NUMERICAL CONTROL WITH PARAMACRO CAPABILITY

This application is a continutation of application Ser. No. 284,528, filed July 20, 1981.

BACKGROUND OF THE INVENTION

The field of the invention is numerical control systems for machine tools such as those disclosed in U.S. Pat. Nos. 4,038,533 and 4,228,495, and particularly, means for enabling general purpose numerical control systems to be easily configured to a particular machine tool and means for facilitating the development of part programs for such machines.

When a numerical control system is mated with a particular machine tool, the manufacturer often provides commonly used stored programs which can be called up by the user's part programs. Such stored programs are referred to as "canned cycles" and they perform such repetitive functions as drilling a specified hole pattern, drilling an tapping holes, and other often-repeated turning and milling functions. In addition, some controls allow the user to load such canned cycles from the part program and to make repeated calls to it during the execution of the remainder of the part program.

In prior art numerical controls, stored programs are not general purpose, but are instead, very specific. For example, a canned cycle for drilling a hole pattern would specify the number of holes and their precise spacing with respect to one another. Although the entire hole pattern might be locatable on the part being machined, there were no other variables. As a result, either many canned cycles were stored, or the hole patterns were defined separately in each part program run on the machine.

Another limitation on prior numerical control systems is the inability of the machine operator to change, or edit, canned programs during the execution of a part program. Although part program blocks can be edited "on-line" and entire canned programs can be replaced "off-line", there is no means on prior systems for changing canned program dimensions just prior to running them. For example, it may be desirable just prior to running a canned program to adjust a dimension to account for tool wear.

SUMMARY OF THE INVENTION

The present invention relates to a numerical control system in which part programs and canned programs may contain variables in lieu of constants, and in which these variables may be assigned values by the part program or by the machine operator. More particularly, the numerical control system includes processor means for sequentially executing part program instructions which direct the machining of a part, means coupled to the processor for storing a macroprogram, means associated with the processor for executing the instructions in a stored macroprogram in response to a macro call instruction contained in the part program being executed, a parameter table coupled to the processor for storing a set of parameter values, and means associated with the processor which is responsive to the detection of instructions in either the part program or the macroprogram that contain parameters to substitute the corresponding parameters value from the parameter table before the instruction is executed.

The numerical control system of the present invention also includes means for detecting parameter assignment instructions in a part program and parameter assignment commands manually entered by an operator. Parameter assignment instructions and commands include data which assign values to selected parameters in the parameter table. Such an instruction or command may assign a constant value to a parameter or it may assign a variable value in the form of a mathematical expression which contains other parameters. In such case, the numerical control system also includes means associated with the processor for calculating the value of a parameter from a mathematical expression when that value is required to execute a part program instruction.

A general object of the invention is to provide a numerical control system which can store and execute macroprograms that can be employed in a wide variety of applications. The macroprogram is comprised of instructions which employ parameters rather than constants. Prior to calling the macroprogram, therefore, parameter assignment instructions are executed to assign values to the macroprogram parameters. In this fashion, for example, a generalized macroprogram which calls for drilling a hole pattern can be specified by assigning values to the parameters which correspond to the spacing between holes.

Another object of the invention is to enable the parameter assignment to be made in the part program instruction which calls the macroprogram.

Another object of the invention is to enable the machine operator to manually assign parameter values during part program execution. The numerical control system is responsive to commands entered through a keyboard. Such commands enable the operator to view the contents of the parameter table and to reassign selected parameter values prior to executing a part program. Also, the numerical control system is responsive to "comment" instructions in the part program being executed to display to the operator the parameter values assigned by the part program. The operator can override these values by manually assigning selected values through the keyboard commands.

Another object of the invention is to enable parts of varying sizes and shapes to be machined from a single part program. This is accomplished by defining dimensions as expressions containing a single parameter. The entire part can then be scaled or rotated merely by assigning a new value to the single parameter. The numerical control system calculates all other values from the arithmetic expressions stored in the parameter table as they are required to machine the part.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 7 is an electrical schematic diagram of the front panel processor portion of the system of FIG. 1;

DESCRIPTION OF THE PREFERRED EMBODIMENT

Figure 1:
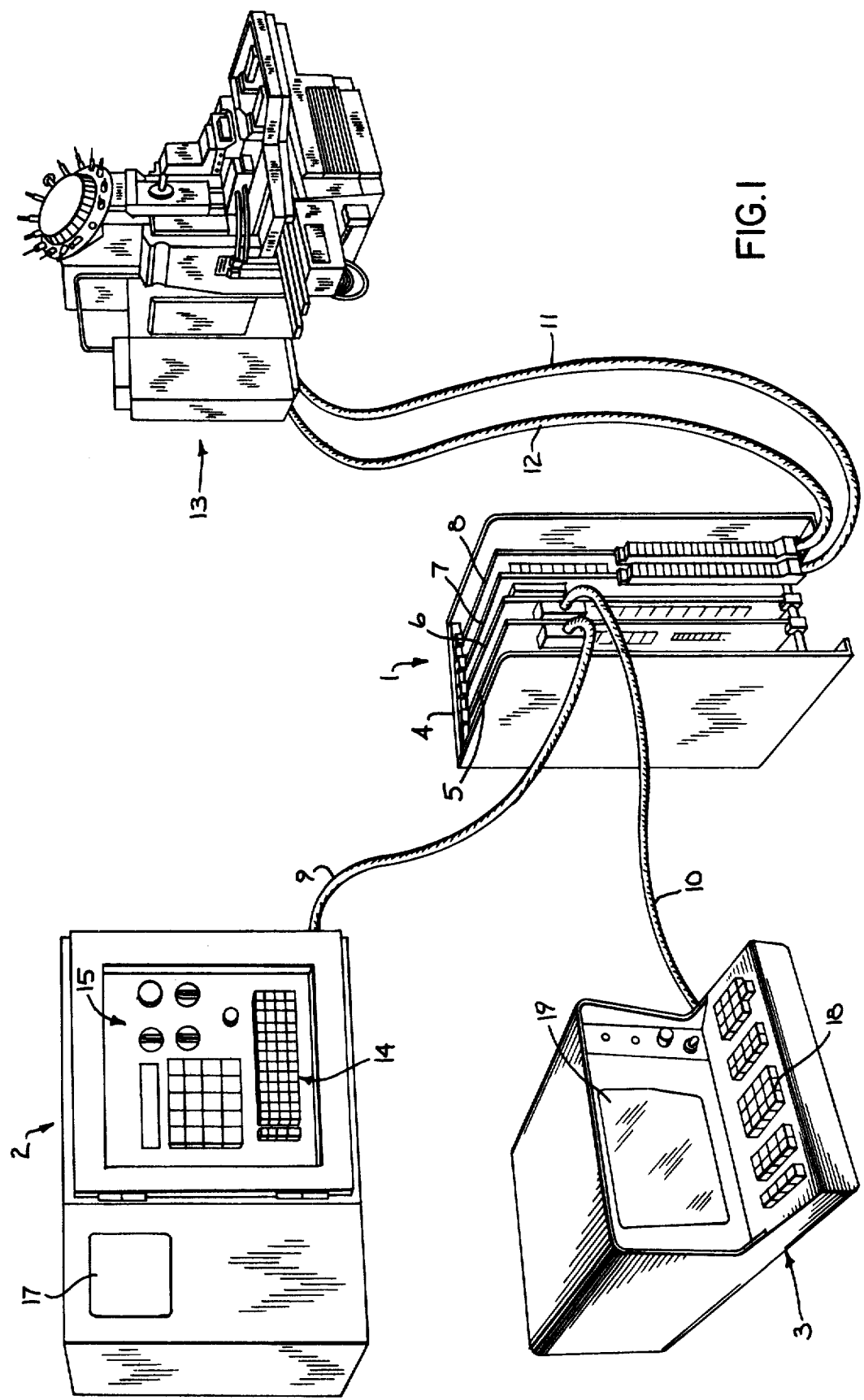
FIG. 1 is a pictorial view of the numerical control system of the present invention.

Referring to FIG. 1, the preferred embodiment of the numerical control system of the present invention is housed within a main enclosure 1 and a pendent control station 2. A program panel station 3 is also employed to load and edit the control program executed by the programmable interface processor, but it does not form part of the operating system. The numerical control system may also include a tape drive (not shown in the drawings) through which part program data is entered into the system, or the numerical control system may receive part program data from a host computer (not shown in the drawings). The machine operator controls the system through a set of switches 15 and a keyboard 14 on the pendent station 2. Part program instructions, as well as data which is manually entered through the keyboard 14, is displayed on a CRT 17 which also forms part of the pendent station 2. The present invention relates primarily to the means which enable the numerical control system to execute part programs containing parameters and calls to macroprograms stored within the numerical control system, and to the means which enables an operator to maintain a parameter table stored within the numerical control system.

Most of the circuitry for implementing the present invention is contained in the main enclosure 1.

The main enclosure 1 includes a main processor circuit board 5, a programmable interface circuit board 6, a servomechanism interface board 7 and an I/O interface board 8. The main processor circuit board 5 is connected to the pendent control station 2 through a cable 9 and the programmable interface circuit board 6 is connected to the program panel station 3 through a cable 10. Similarly, the servomechanism interface board 7 and the I/O interface board 8 are connected by cables 11 and 12 to the machine tool 13 which is being controlled. Typically, the main enclosure 1 is housed in a cabinet attached to the machine tool 13 and the cables 11 and 12 contain numerous leads which connect with equipment in the same cabinet. In contrast, the cables 9 and 10 are serial data links which may extend up to 50 feet in length.

The pendent control station 2 is mounted in a location which is convenient to the machine tool operator. It includes a front panel processor circuit board (not shown in the drawings) which connects to the cable 9 and which includes circuitry that processes data from the keyboard 14 and switches 15 and outputs data to the CRT display 17.

The program panel station 3 includes a keyboard 18 and a display 19. The program panel station 3 is connected to the programmable interface circuit board 6 by the cable 10, and it is operated to load and edit a control program of the type executed by programmable controllers. After this operation is completed, the program panel station 3 may be disconnected and used on other machines.

MAIN PROCESSOR HARDWARE

Figure 2:
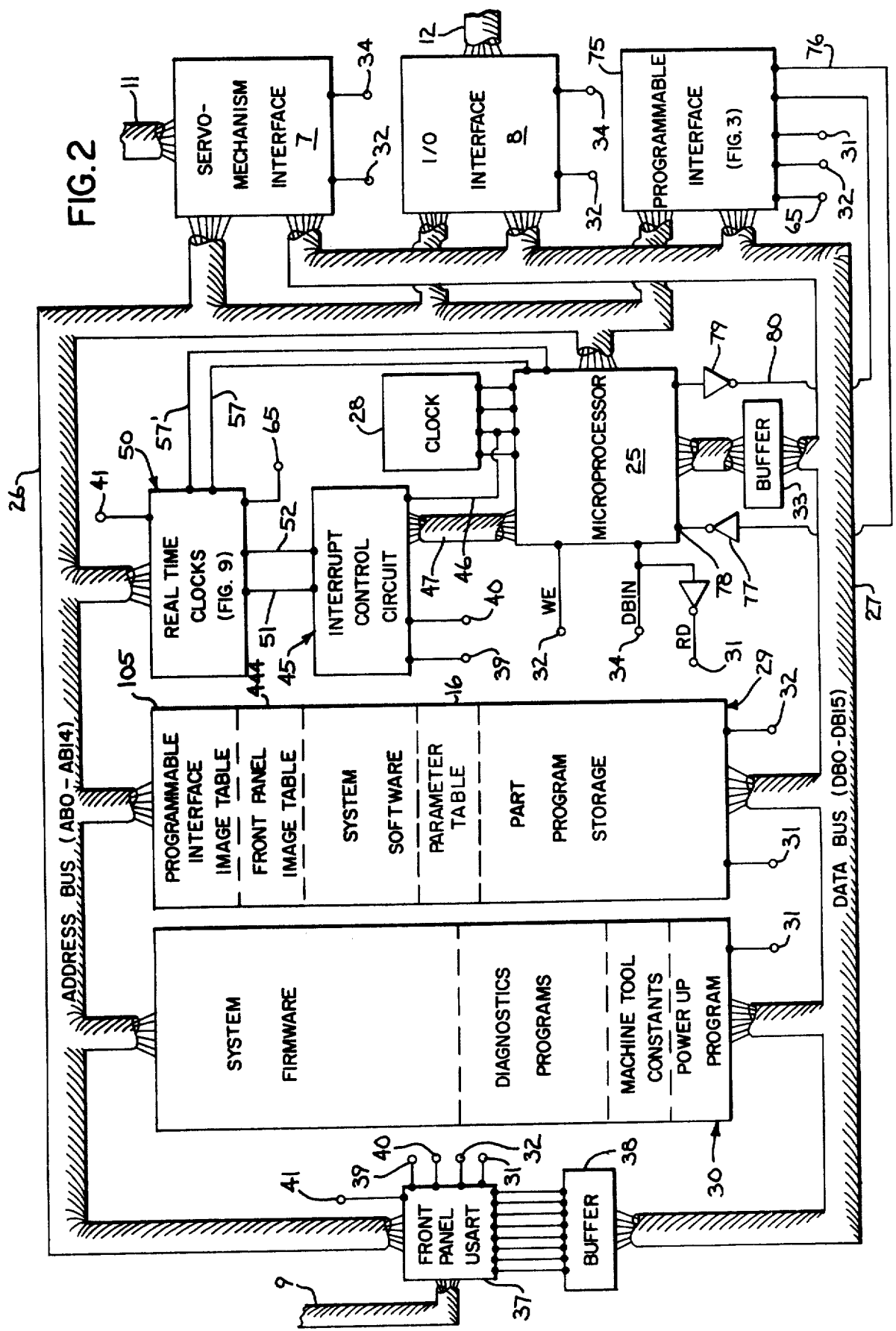
FIG. 2 is an electrical schematic diagram of the main processor portion of the system of FIG. 1.
Figure 3:
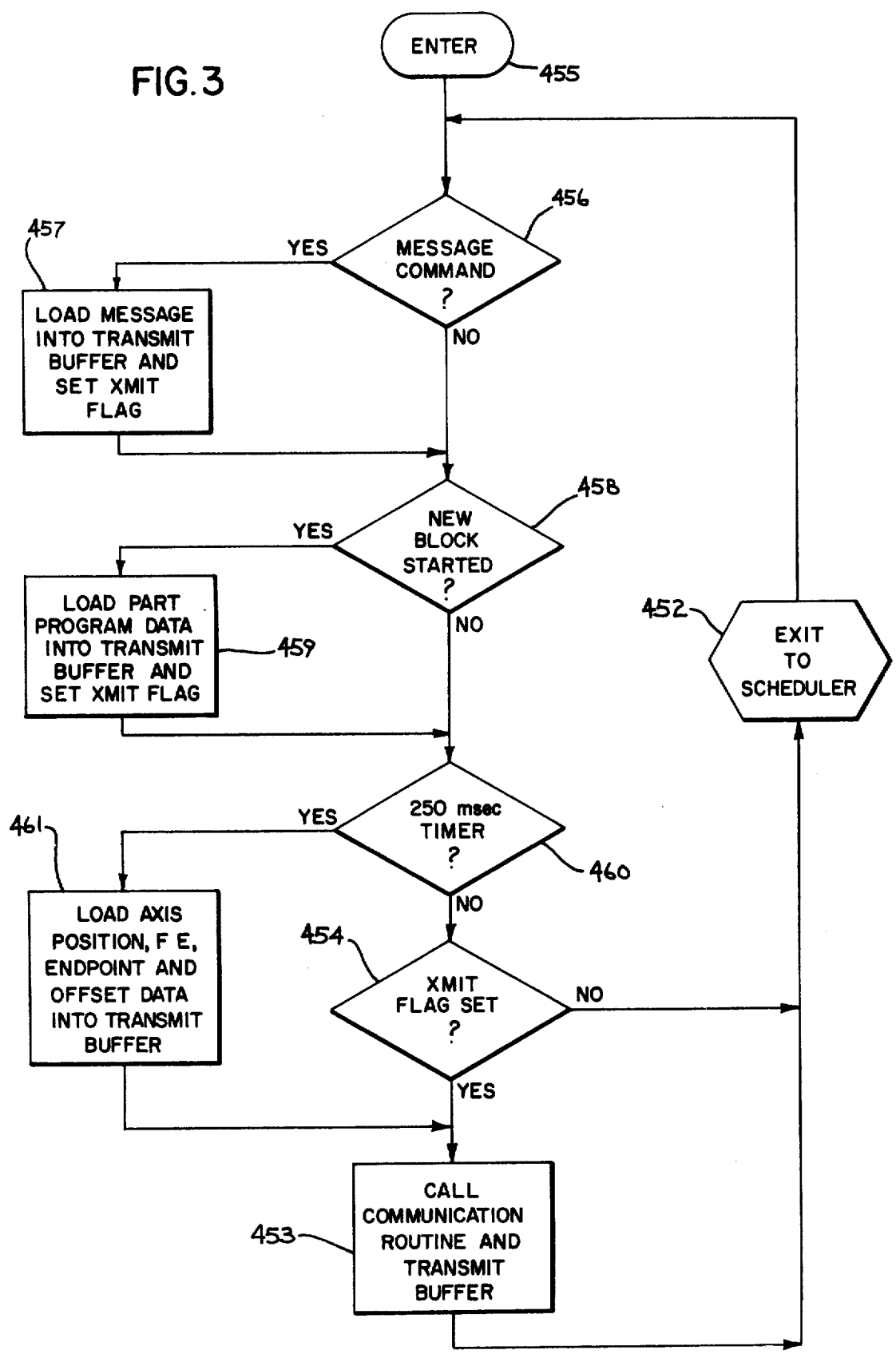
FIG. 3 is a flow chart of the display update process which forms part of the system of FIG. 15.

Referring particularly to FIG. 2, the main processor of the numerical control system is mounted on the circuit board 5 and is formed around a 16-bit microprocessor 25 which is connected to a fifteen-lead address bus 26 and a sixteen-lead data bus 27. A TMS 9900 microprocessor manufactured by Texas Instruments Incorporated is employed and it is driven by a 3.3 megahertz, four-phase clock 28. The address bus 26 and the data bus 27 are also formed in the motherboard 4 and they connect to a number of system elements including a random access memory 29 and a read-only memory 30. Although the size of the memories 29 and 30 can vary considerably depending upon the particular requirements of the system, the basic system includes a 17-bit by 4K random access memory 29 and a 16-bit by 12K read-only memory 30. An RD control line 31 connects both the random access memory 29 and the read-only memory 30 to the microprocessor 25 and a WE control line 32 connects between the random access memory 29 and the microprocessor 25. A 16-bit word is read from either the random access memory 29 or the read-only memory 30 when a selected memory line is addressed through the bus 26 and a logic low control signal is applied to the RD control line 31. The 16-bit word thus read from either the memory 29 or 30 is coupled through the data bus 27 and through a 16-bit buffer 33 to a designated register inside the microprocessor 25. A 16-bit data word is written into the random access memory 29 by addressing a selected line in the memory 29 through the bus 26 and applying a logic low control signal on the WE control line 32. Additional memory may be added to the system, and by expanding the address bus to nineteen leads, up to 512K of memory can be accommodated. As will be described in more detail hereinafter, the random access memory 29 stores a parameter table 16 that is an important element of the present invention.

Referring particularly to FIG. 2, the data bus 27 and the address bus 26 also connect through the motherboard 4 to circuits on the servomechanism interface board 7. The servomechanism interface board 7 includes 16-bit motion command registers (not shown in the drawings) and 16-bit feedback word registers (not shown in the drawings). These registers can be separately addressed through the address bus 26 and a 16-bit motion command word can thus be written into any one of the motion command registers when a logic low voltage is applied to the WE control line 32. Similarly, a 16-bit following error word can be read from an addressed feedback register when a logic low voltage is generated on a DBIN control line 34.

As is well known in the art, by periodically calculating a new position command number which is output to the servomechanism on the machine tool 13, the motion of a cutting tool can be precisely controlled. In such case, one position command register and one feedback register is associated with each axis of motion. Although the control loop could be closed within the main processor, in the preferred embodiment the control loop for each axis of machine motion is closed on the servomechanism interface board 7 employing techniques such as that disclosed in U.S. Pat. No. 3,752,969 issued on Aug. 14, 1973 and entitled "Method and Means for Updating the Position Dimension of a Numerically Controlled Machine Tool."

Referring particularly to FIG. 2, the data bus 27 and the address bus 26 also connect through the motherboard 4 to circuits on the I/O interface boards 8. The I/O interface circuit boards 8 include sets of sixteen input circuits and sets of sixteen output circuits. The input circuits are each individually connected to a sensing device on the machine tool 13, such as a limit switch, and each output circuit is connected to an operating device on the machine tool 13, such as a motor starter or solenoid. Input circuits such as those disclosed in U.S. Pat. Nos. 3,643,115 and 3,992,636 may be employed and output circuits such as that disclosed in U.S. Pat. No. 3,745,546 may be employed. Data may be written into a set of output circuits by generating the appropriate address on the bus 26 and applying a logic low voltage to the WE control line 32. Similarly, data can be read from a set of input circuits by generating the proper address on the address bus 26 and applying a logic low voltage to the DBIN control line 34. Although data is written into and read from the I/O interface circuits 8 in sixteen-bit words, it should be apparent that each bit is associated with a discrete sensing or operating device on the machine tool 13. It is these discrete devices which are readily controlled using programmable controller techniques.

Referring particularly to FIGS. 1 and 2, the communication of data to and from pendent control station 2 is provided by a front panel USART 37. The USART 37 includes eight data terminals which connect through a set of eight bidirectional buffers 38 to the eight least significant digit leads DB8-DB15 in the main processor data bus 27. The cable 9 connects to a data receive terminal and a data transmit terminal on the USART 37 and when an eight-bit byte of data is received through the cable 9 from the pendent control station 2, a logic low interrupt is generated on a control line 39. This interrupt is serviced by the microprocessor 25 which generates the address of the front panel USART 37 on the address bus 26 and generates a logic low voltage on the RD control line 31 to read the received byte of data onto the data bus 27. Conversely, when an eight-bit byte of data is to be transmitted to the program panel station 3, an interrupt is generated by the USART 37 on an interrupt control line 40 to indicate that the previous byte of data has been transmitted. The microprocessor 25 responds by executing an interrupt service routine stored in the read-only memory 30 which addresses the front panel USART 37 through the address bus 26 and generates a logic low voltage on the WE control line 32. An eight-bit byte of data is thus coupled through the buffers 33 onto the data bus 27 and written into the USART 37. The USART 37 then transmits the eight-bit byte of data serially through the cable 9 to the pendent control station 3. The USART 37 is driven by a two megahertz clock that is applied to it through a control line 41.

The USART 37 is a universal receiver/transmitter which interfaces the main processor with the serial data link formed by cable 9. Data is received serially in eight-bit bytes from the cable 9, is checked for transmission errors, and is read out onto data bus 27 as eight parallel bits. A similar universal receiver/transmitter is connected to the other end of the cable 9 at the pendent control station 2 and full duplex serial communication is established on the cable 9. The cable 9 includes only four leads and it may extend up to fifty feet in length according to RS-232 protocol.

The interrupts generated by the front panel USART 37 and other elements in the system are received at an interrupt control circuit 45. Referring particularly to FIG. 2, the interrupt control circuit 45 is connected to receive the third-phase clock signal from the four-phase clock 28 through a line 46, and it has a set of four interrupt code outputs and an interrupt request output which connect through a bus 47 to the microprocessor 25. The interrupt control circuit 45 is a commerically available integrated circuit model TMS 9901, and for a complete description of its structure, operation and connection to the microprocessor 25, reference is made to *TMS 9901 Programmable Systems Interface Data Manual* published July, 1977 by Texas Instruments Incorporated. The interrupt control lines 39 and 40 from the front panel USART 37 connect to this interrupt control circuit 45 and the circuit 45 is responsive to a signal on either of these lines to generate a four-bit code along with an interrupt request to the microprocessor 25. The interrupt control circuit 45 also determines the priority of interrupts and a list of the USART 37 interrupts along with other main processor interrupts is provided in Table A in the order of their priority. Some of these interrupts, including those generated by the USART 37, can be disabled, or masked, so that they are not applied to the microprocessor 25.

TABLE A

| Interrupt | Description |
| --- | --- |
| 0 | Restart system. |
| LD | Power on reset. |
| 1 | Standby power has failed. |
| 2 | Single step through program. |
| 3 | Data received by USART 37. |
| 4 | Data transmitted by USART 37. |
| 5 | Time out error on slow memory ready line. |
| 6 | Parity error when reading data bus 27 |
| 7 | Watchdog timer timed out. |
| 8 | 1.6 millisecond clock. |
| 9 | 100 millisecond clock. |

Figure 9:
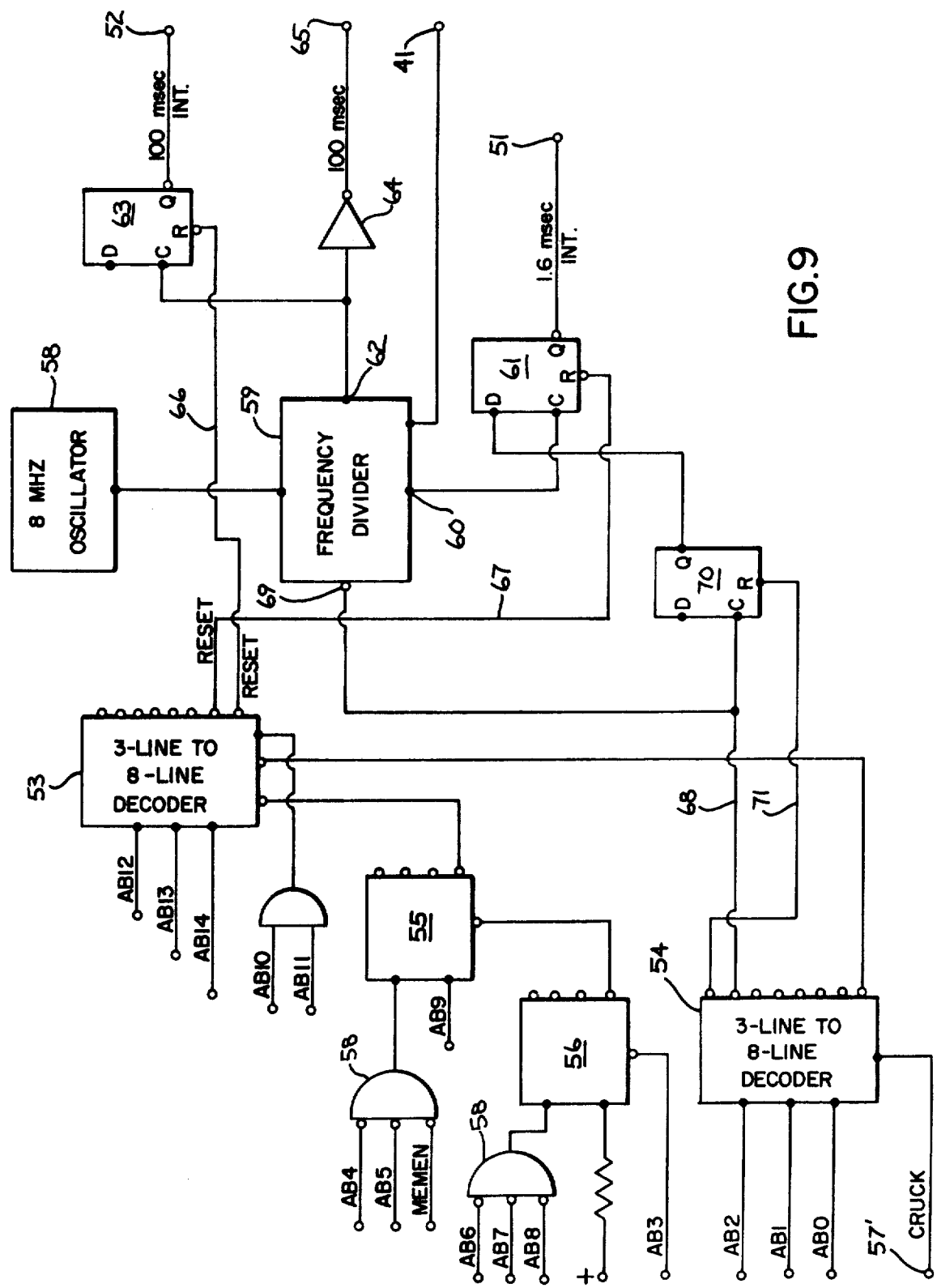
FIG. 9 is an electrical schematic diagram of the real time clock circuit which forms part of the main processor of FIG. 2.

Referring particularly to FIGS. 2 and 9, a real time clock circuit 50 is connected to the address bus 26 and it generates a 1.6 millisecond interrupt through a line 51 and a 100 millisecond interrupt through a line 52 to the interrupt control circuit 45. The real time clock circuit 50 includes a pair of 3-line-to-8-line decoder circuits 53 and 54 and a pair of 2-line-to-4-line decoder circuits 55 and 56. The input terminals as well as one enabling terminal on the decoder circuit 53 are connected to the leads AB10–AB14 in the address bus 26, and the input terminals on the decoder circuit 54 connect to the leads AB0–AB2 in the address bus 26. A CRUCLK control line 57' connects an enable terminal on the decoder circuit 54 to the microprocessor 25. A MEMEN control line 57 from the microprocessor 25 connects through a gate 58 to one input of the decoder circuit 5 and the lead AB9 connects to its other input. The decoder circuit 56 is enabled by lead AB3 in the address bus 26 and one of its inputs is driven by a gate 58' which connects to address bus leads AB6–AB8. These decoder circuits are operated when the microprocessor 25 executes the proper instructions to reset the interrupt request hardware now to be described after the request is acted upon.

The real time clock circuit 50 includes an eight megahertz oscillator 58 which drives a multistage binary counter indicated as a frequency divider 59. One output 60 on the frequency divider 59 generates a logic high voltage pulse every 1.6 milliseconds to the clock terminal of a D-type flip-flop 61, and a second output 62 on the frequency divider 59 connects to the clock input on a second D-type flip-flop 63. The second output terminal 62 also connects through an inverter gate 64 to a 100 millisecond clock line 65. A Q output on the first D-type flip-flop 61 connects to the 1.6 millisecond interrupt line 51 and a Q output terminal on the second D-type flip-flop 63 connects to the 100 millisecond interrupt line 52.

Every 100 milliseconds the second D-type flip-flop 63 is set through its clock terminal and a logic low voltage is generated on the 100 millisecond interrupt line 52 to the interrupt control circuit 45. A reset terminal on the D-type flip-flop 63 is connected through a reset line 66 to the eighth output terminal on the 3-line-to-b 8-line decoder circuit 53. After the 100 millisecond interrupt is acted upon by the microprocessor 25, an instruction is executed by the microprocessor 25 which generates a logic low reset pulse on the line 66 to reset the second D-type flip-flop 63 and to thereby remove the interrupt request on the line 52.

Similarly, every 1.6 milliseconds the first D-type flip-flop 61 is set through its clock terminal and a logic low voltage is generated on the 1.6 millisecond interrupt request line 51 to the interrupt control circuit 45. After the interrupt is acknowledged, the microprocessor 25 executes an instruction which generates a logic low reset pulse on a line 67 that connects the seventh output of the 3-line-to-8-line decoder 53 to a reset terminal on the D-type flip-flop 61. The D-tyupe flip-flop 61 is thus reset and the logic low interrupt request on the line 51 is removed.

The operation of the real time clocks are controlled to some extent by program instructions executed by the microprocessor 25. More specifically, when a selected instruction is executed by the microprocessor 25, a logic low voltage is generated on a CLOCK ON line 68 by the second output of the 3-line-to-8-line decoder circuit 54. The CLOCK ON line 68 connects to a reset terminal 69 on the frequency divider 59 as well as a clock terminal on a third D-type flip-flop 70. The Q output on the third D-type flip-flop 70 connects to the D input on the first D-type flip-flop 61. When a logic low voltage is generated on the CLOCK ON line 68, the flip-flop 70 is set to effectively enable 1.6 millisecond interrupts to be applied to the line 51. On the other hand, a CLOCK OFF line 71 connects the first output of the 3-line-to-8-line decoder circuit 54 to a reset terminal on the third D-type flip-flop 70 and when this is driven to a logic low voltage by the execution of another selected instruction, the third D-type flip-flop 70 is reset. The logic low voltage thus generated at its Q output effectively prevents the fist D-type flip-flop 61 from being set and it thus prevents the generation of 1.6 millisecond interrupt signals on the line 51.

Referring to FIG. 2, a programmable interface circuit 75 is contained on the programmable interface circuit board 6 and is connected to the main processor data bus 27 and the main processor address bus 26. In addition, the programmable interface circuit 75 connects to the RD control line 31. The WE control line 32 and it receives the 100 millisecond clock from the real time clock circuit 50 through the line 65. The programmable interface circuit 75 is a separate processor and this processor periodically obtains control of the main processor data bus 27 and address bus 26 by generating a logic low signal on a DMA REQ control line 76. This control signal is coupled through an inverter gate 77 to a HOLD terminal 78 on the microprocessor 25. When the request is granted, a signal is generated by the microprocessor 25 through an inverter gate 79 and DMA GNT control line 80 back to the programmable interface circuit 75.

Referring particularly to FIG. 2, the programmable interface circuit 75 directs the transfer of data to and from the main processor. It transfers data to and from two general locations, a programmable interface image table 105 stored in the random access memory 29, and the I/O interface circuits 8. The programmable interfce circuit 75 addresses these locations using the main processor address bus 26 which is relinquished to it when a DMA request is granted.

PENDENT CONTROL STATION HARDWARE

Referring particularly to FIGS. 1, 2 and 7, the pendent control station 2 is connected to the main processor circuit board 5 by the cable 9. The cable 9 connects to a USART 220 at the pendent control station 2. The USART 220 is mounted on a circuit board (not shown in the drawings) with other elements of a front panel processor. These elements include a sixteen-bit microprocessor 221 which is a model TMS 9900 manufactured by Texas Instruments, Inc. The microprocessor 221 is connected to drive a fifteen-lead address bus 222 and it is connected to a sixteen-lead bidirectional data bus 223.

Machine instructions for the microprocessor 221 are stored in a sixteen-bit by 16K line programmable read-only memory 224. Also connected to the address bus 222 and the data bus 223 is a sixteen-bit by 4K line random access memory 226 and a four-bit by 2K line electrically alterable read-only memory 225 which stores display messages. Data may be read from any of the three memories 224-226 when they are enabled through respective PROM EN, EAROM EN and CS control lines 227-229 and when the proper logic state is generated on respective AD and WE control lines 230 and 231. Data can also be written into the random access memory 226 when it is enabled through the CS control line 229 and when the WE control line 231 is at a logic high voltage state. Data can also be written into the electrically alterable read-only memory 225 when it is enabled through the EAROM EN control line 228 and a logic low voltage appears on the WE control line 231. The particular line into which data is written or from which data is read in any of the memories 224-226 is selected by the address on the address bus 222.

Figure 11:
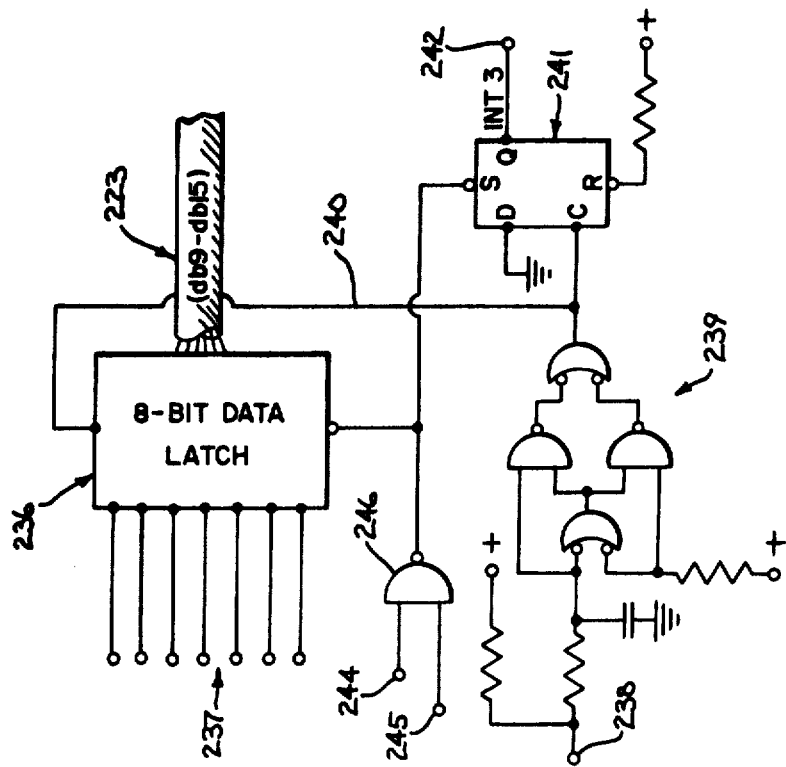
FIG. 11 is an electrical schematic diagram of the keyboard interface circuit which forms part of the front panel processor of FIG. 7.

Referring particularly to FIGS. 1, 7 and 11, the keyboard 14 on the pendent control station 2 is coupled to the front panel processor data bus 223 by a keyboard interface circuit 235. The keyboard interface circuit 235 includes an eight-bit data latch 236 which has seven of its input terminals connected through leads 237 to the keyboard 14. When an ASCII character is generated on the leads 237 by the keyboard 14, a logic low strobe signal is simultaneously generated on a control line 238. The strobe signal is coupled through a set of gates 239 to a line 240 which connects to a clock terminal on the eight-bit data latch 236. The ASCII character is thus clocked into and stored in the eight-bit data latch 236. The same strobe signal is also applied to the clock terminal of an interrupt request flip-flop 241 which has its Q terminal connected through an INT 3 control line 242 to an interrupt and serial I/O control circuit 243. The flip-flop 241 is set by the keyboard strobe signal and an interrupt is requested. In response to this interrupt request the microprocessor 221 executes a keyboard service routine which includes an instruction that generates a logic high voltage on a KEYBD EN control line 244 and a DBIN control line 245. A NAND gate 246 in the keyboard interface circuit 235 is enabled by these control signals and its output is driven low to not only set the interrupt request flip-flop 241, but to gate the ASCII character stored in the eight-bit data latch 236 onto the leads DB9-DB15 of the data bus 223.

Figure 12:
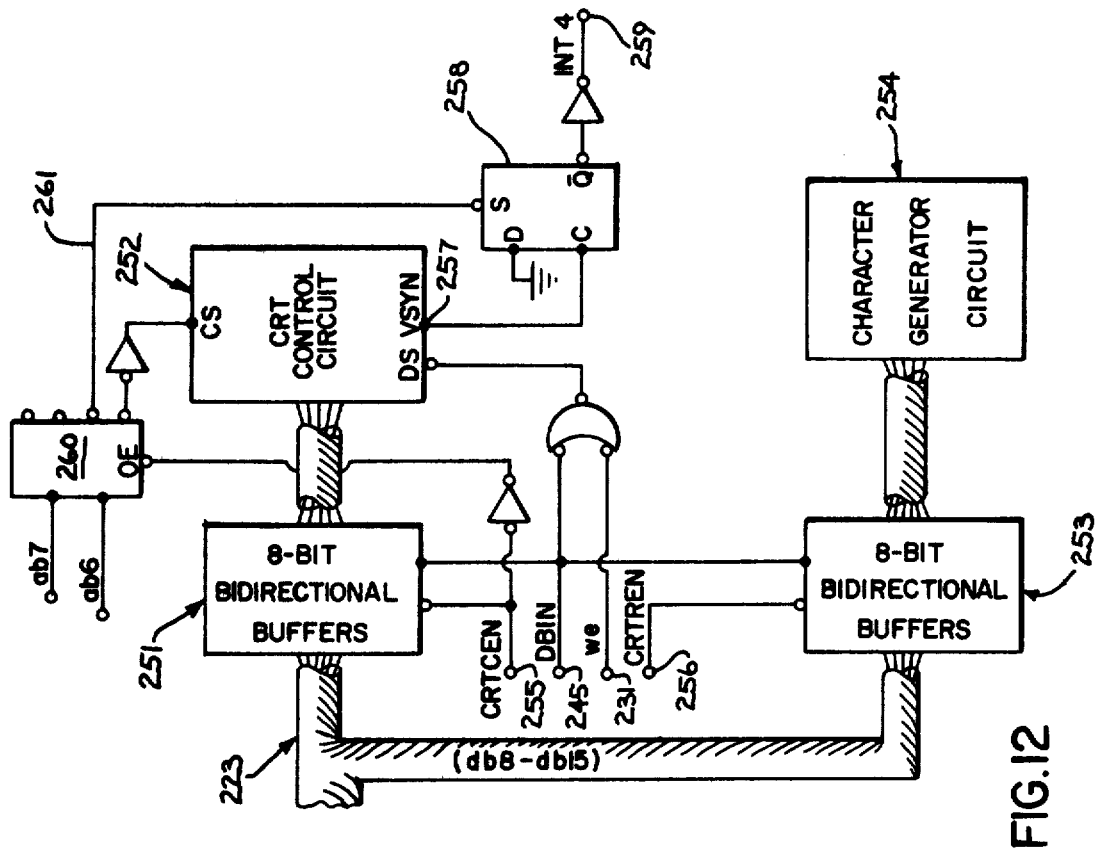
FIG. 12 is an electrical schematic diagram of the CRT interface circuit which forms part of the front panel processor of FIG. 7.

Referring particularly to FIGS. 1, 7 and 12, the CRT display 17 on the pendent control station 2 is coupled to the data bus 223 of the front panel processor by a CRT interface circuit 250. The interface circuit 250 includes a first set of eight bidirectional buffers 251 which connect leads DB8-DB15 in the data bus 223 to a CRT control circuit 252. A second set of eight bidirectional buffers 253 connect the same data bus leads to a character generator circuit 254. Control data is coupled through the buffers 251 to the CRT control circuit 252 when a logic low voltage is generated on a CRTCEN control line 255, and data is coupled through the buffers 253 to the character generator circuit 254 when a logic low voltage is generated to a CRTREN control line 256.

The CRT control circuit 252 generates an interrupt request at a VSYN terminal 257 when data is required by the CRT display 17. This request is applied to the clock terminal of a D-type flip-flop 258 and the Q output terminal on this flip-flop is coupled to the interrupt and serial I/O control circuit 243 through an INT 4 control line 259. When the interrupt is acknowledged, a CRT service routine is executed by the microprocessor 221 that includes an instruction which enables a 2-line-to-4-line decoder circuit 260 through the CRTCEN control line 255. This same instruction generates a code on address bus lweads AB6 and AB7 that connect to the input terminals of the decoder circuit 260 and a logic low voltage is generated by the decoder circuit 260 on a line 261. This voltage sets the D-type flip-flop 258 to remove the interrupt request on the INT 4 control line 259. There are numerous CRT control circuits and character generator circuits known to those skilled in the art and reference is made to "Application Note 1-1 5027 Video Timer-Controller" published in 1978 by Standard Microsystems Corporation for a more detailed description of the circuit employed in the preferred embodiment.

Figures 13, 25:
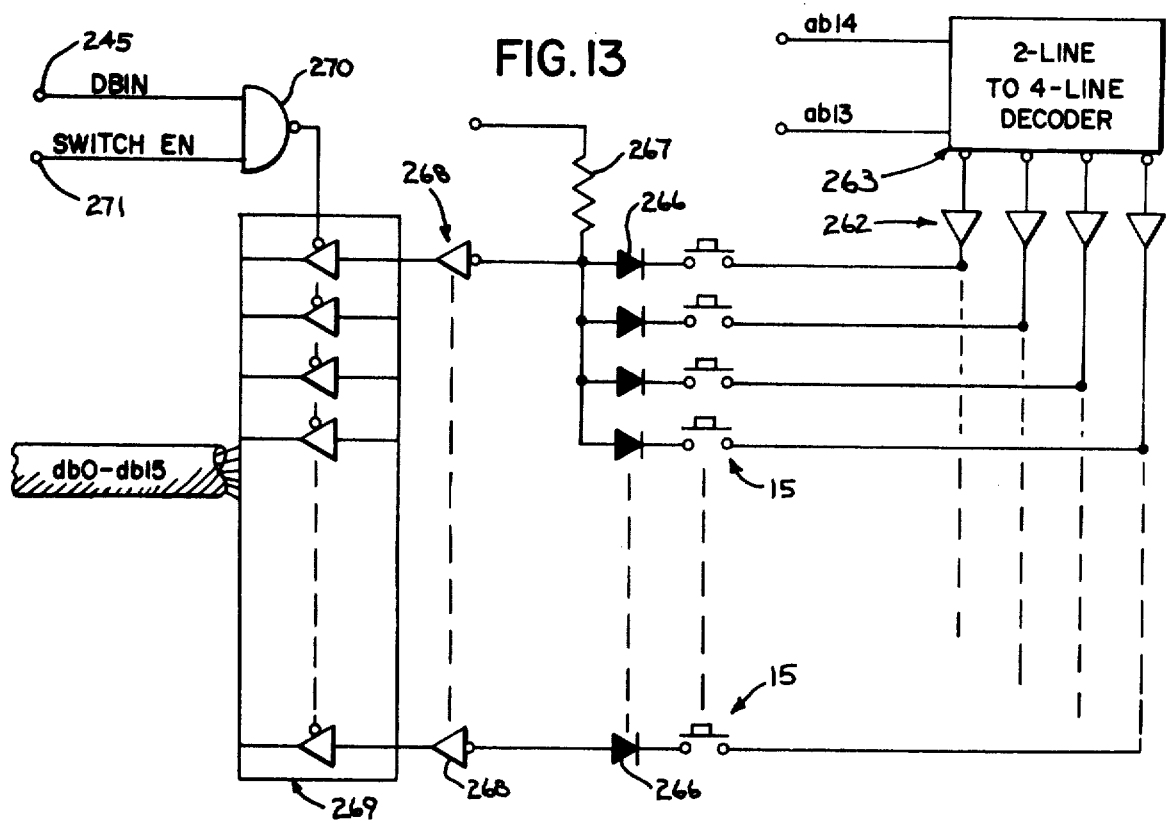
FIG. 13 is an electrical schematic diagram of the switch and display interface circuit which forms part of the front panel processor of FIG. 7.
FIG. 25 is a pictoral view of data which is displayed to the machine operator.

Referring particularly to FIGS. 1, 7 and 13, the switches 15 on the pendent control station 2 are coupled to the address bus 222 and the data bus 223 by a switch interface circuit 265. Each switch 15 on the pendent station 2 is connected between a scanning gate 262 and a logic high voltage source in series with a diode 266 and a resistor 267. Each set of four switches 15 is also coupled through a buffer 268 to one of sixteen tri-state gates 269. The outputs of the tri-state gates 269 are connected to the leads DBO-DB15 in the data bus 223 and their enabling terminals are commonly connected to the output of a NAND gate 270. The NAND gate 270 is driven by the DBIN control line 245 and by a "switch en" control line 271. There are four scanning gates 262, each connected to the output of a 2-line-to-4-line decoder 263 and each connected to a set of four of the switches 15. The two inputs on the decoder 263 are connected to leads AB13 and AB14 in the address bus 222 and when selected instructions are executed by the microprocessor 221, the NAND gate 240 is enabled and the states of one of four sets of sixteen switches 15 are gated onto the data bus 223. The four 16-bit data words input from the switch interface circuit are stored in a four-line front panel image table portion 233 of the RAM 226.

Figure 10:
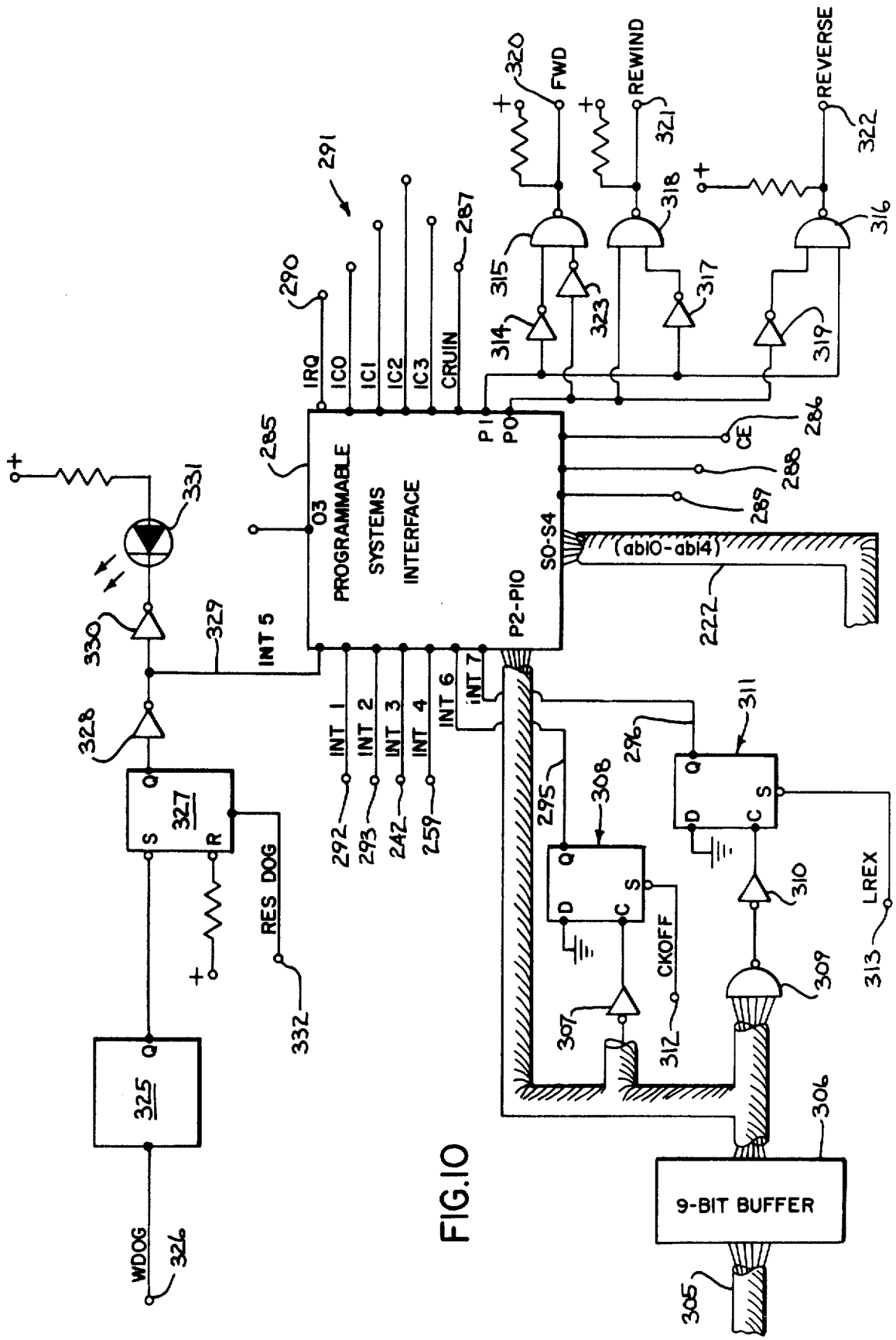
FIG. 10 is an electrical schematic diagram of the interrupt and I/O control circuit which forms part of the front panel processor of FIG. 7.

Referring particularly to FIGS. 7 and 10, the remaining input/output devices associated with the pendent control station 2 are coupled to the microprocessor 221 by the interrupt and I/O control circuit 243. The control circuit 243 includes a programmable systems interface circuit 285 which is an integrated circuit model TMS 9901 manufactured by Texas Instruments, Inc. The programmable systems interface circuit 285 communicates with the microprocessor 221 through a communication register unit (inside the microprocessor 221). The connection to this "CRU" register is accomplished by five address select lines (S0-S4) which connect to leads AB10-AB14 in the address bus 222, a CE enable line 286 and three communication register unit control lines CRUIN 287, CRUOUT 288 and CRUCK 289. A selected bit, determined by the state of inputs S0-S4, may be strobed out of the sixteen-bit communication register unit in the microprocessor 221. This data bit appears on the CRUOUT control line 288 when the CRUCK control line 289 is strobed. Similarly, a data bit may be written into this same register through the CRUIN control line 287 when the CRUCK control line 289 is strobed.

The programmable systems interface 285 is also connected to the microprocessor 221 through an interrupt request line (IRQ) 290 and four interrupt code lines (IC0-IC3) indicated at 291. Seven interrupt inputs, INT1-INT7 are connected to receive interrupt requests from various system elements such as the CRT interface circuit 250 (through the INT4 control line 259) and the keyboard interface circuit 235 (through the INT3 control line 242). In addition, a control line INT1 292 connects to the main processor USART 220, and an INT2 control line 293 connects to an auxiliary USART 294. Two additional control lines (INT6 and INT7) 295 and 296 are associated with a tape reader 297.

When one of the control lines INT1-INT7 is driven low, the programmable systems interface 285 passes the signal to an internal priority encoder where the highest priority interrupt signal is encoded into a four-bit binary code. This code is generated on the IC0-IC3 control lines 291 to the microprocessor 221 along with an interrupt request on the IRQ control line 290. This four-bit code is employed by the microprocessor 221 to identify which of the peripheral devices or I/O devices is requesting the interrupt.

Referring particularly to FIGS. 7 and 10, whereas the keyboard interface circuit 235 and the CRT interface circuit 250 couple data in parallel to the data bus 223, the main processor USART 220 and the auxiliary USART 294 exchange data serially with the microprocessor 221 via the CRUIN data line 287 and the CRUOUT data line 288. For example, when a byte of data is received by the main processor USART 220 through the cable 9, it requests an interrupt through the INT1 control line 292. When the interrupt request is passed on to the microprocessor 221 by the control circuit 243, the microprocessor 221 jumps to a USART interrupt service routine. Instructions in this routine enable the main processor USART 220 through a control line 298 and sequentially read in the byte of data, one bit at a time, through the CRUIN data line 287. Conversely, when data is to be coupled to the main processor through the cable 9, it is generated to the main processor USART 220 through the CRUOUT data line 288, one bit at a time.

The auxiliary USART 294 may be connected through a cable 300 to a TTY, to the host computer in a DNC system, or to a number of other devices. It operates in the same manner as the USART 220 when enabled through a control line 301.

Referring particularly to FIGS. 7 and 10, the tape reader 297 is connected to the interrupt and I/O control circuit 243 through a data and control cable 305. Nine leads in this cable 305, eight of which are data leads and one of which is a strobe line, connect to the inputs of a nine-bit buffer 306. The nine outputs on the buffer 307 connect to respective inputs P2-P10 on the programmable systems interface 285. The strobe line from the tape reader connects through a gate 307 to the clock input on a D-type flip-flop 308, and when an eight-bit byte of date is received at the buffers 306, the flip-flop 308 is reset by the strobe signal to generate a logic low interrupt signal on the INT6 control line 295. A tape reader service routine is executed by the microprocessor 221 when this interrupt request is passed on by the programmable systems interface 285 and the eight-bit byte of tape reader data is input to the microprocessor 221 serially through the CRUIN data line 287. Also, a NAND gate 309 has its inputs connected to the nine outputs of the buffer 306 and its output is coupled through a gate 310 to the clock terminal of a D-type flip-flop 311. When the nine leads are all at a logic high voltage indicating an intercharacter gap, the flip-flop 311 is reset to generate a logic low interrupt request through the INT7 control line 296. This is used in conjuncation with the data strobe to determine whether the tape reader is operating properly. When the interrupts generated by the tape reader are acknowledged by the microprocessor 221, the routines which servie them include instructions that reset the respective flip-flops 308 and 311 through a CKOFF control line 312 and an LREX control line 313.

The tape reader 297 is controlled by a two-bit binary code which is generated at a pair of outputs P0-P1 on the programmable systems interfce 285. The P1 output is connected to one input on a NAND gate 316 and through inverter gates 314 and 317 to inputs on NAND gates 315 and 318. The P0 output connects to a second input on NAND gate 318 and it connects through inverter gates 323 and 319 to second inputs on NAND gates 315 and 316. The output of the NAND gate 315 connects to the tape reader 297 through an FWD control line 320 and when it is driven to a logic low voltage, the tape reader is run in the forward direction. The output of the NAND gate 316 drives a REV control line 322 which connects to the tape reader 297 and operates it in the reverse direction when driven to a logic low voltage. The output of the NAND gate 318 connects to a REWIND control line 321 which rewinds the tape on the tape reader 297 when driven to a logic low voltage. The tape reader control lines 320-322 are operated by the microprocessor 221 in response to the execution of machine instructions which control the outputs P1 and P0 on the programmable systems interface 285 through the CRUOUT data line 288.

Referring still to FIG. 10, the interrupt and I/O control circuit 243 also includes a watchdog timer circuit. This circuit contains a monostable multivibrator 325 which has its input connected to a WDOG control line 326 and its Q output connected to the set terminal on an RS flip-flop 327. The reset terminal on the flip-flop 327 connects to a logic high voltage source and its Q output connects through an inverter gate 328 to an INT 5 control line 329 that connects with the programmable systems interface 285. The output of the inverter gate 328 also connects through a second inverter gate 330 to a light emitting diode 331. The monostable multivibrator 325 is clocked through the WDOG control line 326 and when the front panel processor is operating normally, it will be clocked again before a logic high pulse is generated at its Q output (i.e., within 100 milliseconds) and it will reset. If a malfunction should occur, however, and the monostable multivibrator 325 is not clocked within 100 milliseconds, the flip-flop 327 is set and an interrupt is generated through the INT5 control line 329. Simultaneously, the light emitting diode 331 is de-energized to provide a visual indication of the malfunction. When the malfunction has been corrected, the flip-flop 327 in the watchdog timer circuit is reset through an RES DOG control line 332.

Figure 14:
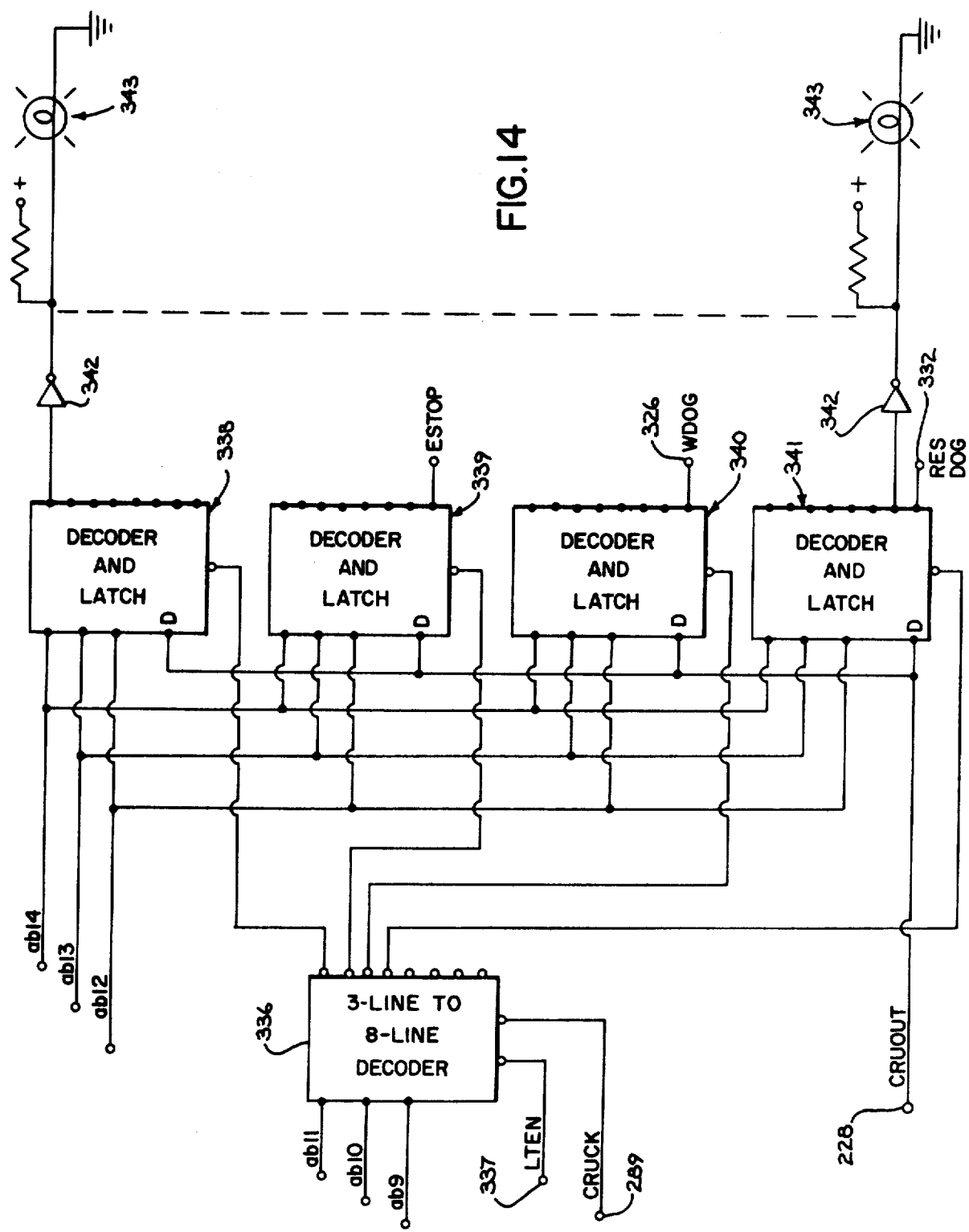
FIG. 14 is an electrical schematic diagram of the control panel light driver circuit which forms part of the front panel processor of FIG. 7.

Referring particularly to FIGS. 7 and 14, data is output from the microprocessor 221 to a control panel light driver circuit 335 via the CRUOUT data line 228. More specifically, a first 3-line-to-8-line decoder circuit 336 has a set of inputs connected to the leads AB-9–AB11 in the address bus 222, and its enable terminal is connected to a LTEN control line 337. An enable terminal on the 3-line-to-8-line decoder 336 connects to the CRUCK control line 289. Four of the eight output terminals on the 3-line-to-8-line decoder circuit 336 are connected to respective clock terminals on four 3-line-to-8-line decoder/latch circuits 338–341. The three inputs on each of the circuits 338–341 connect to the respective leads AB12–AB14 in the address bus 222 and their D input terminals connect to the CRUOUT data line 228. The output terminals on each of the decoder and latch circuits 338–341 are connected through inverter gates 342 to energize selected lights 343 on the pendent control station 2. One of these outputs on the decoder and latch circuit 340 connects to the WDOG control line 326 and an output on the decoder and latch circuit 341 connects to the RES DOG control line 332.

When the 3-line-to-8-line decoder circuit 336 is enabled by the LTEN control line 337 and a timing pulse is received on the CRUCK control line 289, one of the four decoder and latch circuits 338–341 is enabled by the three-bit code on the leads AB9–AB11 of the address bus 222. Simultaneously, one of the eight output terminals on the enabled decoder and latch circuit 338–341 is selected by the three-bit code on the leads AB12–AB14 of the address bus 222. One bit of data is thus clocked into the enabled decoder and latch circuit through the CRUOUT data line 228. In this manner, a selected one of the lights 343 on the pendent control station 2 can be energized or de-energized in response to instructions executed by the microprocessor 221. Also, one such instruction is periodically executed by the microprocessor 221 to restart the watchdog timer circuit and another such instruction is executed to reset the watchdog timer.

Figure 8:
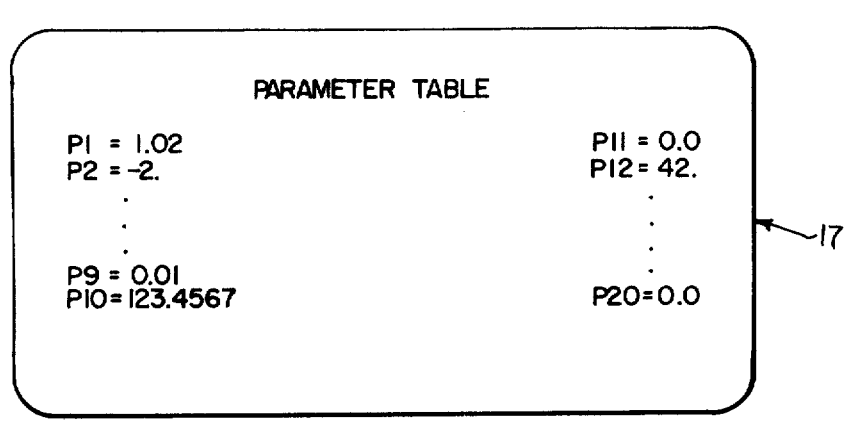
FIG. 8 is a pictoral view of data which is displayed to the machine operator.

Referring particularly to FIGS. 7 and 8, the control lines which enable the various front panel processor elements described above are for the most part driven by a front panel decoding and control circuit 350. The decoding and control circuit 350 is comprised primarily of four 3-line-to-8line decoder circuits 351–354 and these are selectively connected to the leads AB0–AB5 of the address bus 222. The decoders 351 and 354 are enabled by a MEN control line 355 whereas the decoder circuit 352 is enabled by the microprocessor 221 through a CRC control line 356. The outputs of the decoders 351–354 drive the front panel processor control lines as shown in FIG. 8. The instructions which are executed by the microprocessor 221 to operate the various elements of the front panel processor through these control lines include selected operation codes and operands. The operands, or addresses, of the various system elements are indicated in Table B along with the states of the control lines which are driven directly by the microprocessor 221. For a detailed description of the operation codes which operate the microprocessor control lines reference is made to *TMS 9900 Microprocessor Data Manual* published in 1976 by Texas Instruments, Inc.

TABLE B

| DEVICE | MEN | CRC | ADDRESS (HEXA-DECIMAL) |
| --- | --- | --- | --- |
| PROM 224 | X | | 0000–7FFE |
| EAROM 225 | X | | F000–FFFE |
| RAM 226 | X | | C000–DFFE |
| KEYBOARD INTERFACE 235 | X | | E400 |
| CRT BUFFERS 251 | X | | E1000–E31E |
| CRT BUFFERS 253 | X | | 8000–BFFE |
| CRT CONTROL CIRCUIT 252 | X | | E100–E31E |
| CRT FLIP-FLOP 258 | X | | E200 |
| SWITCH TRI-STATE GATES 269 | X | | EC00–EC06 |
| DISPLAY LATCH 274 | X | | E800 |
| DISPLAY LATCH 275 | X | | E802 |
| DISPLAY LATCH 276 | X | | E804 |
| LOAD DISPLAY LINE 279 | X | | E80C |
| CLEAR DISPLAY LINE 280 | X | | E80E |
| LIGHT DRIVER LATCH 338 | X | | 800–807 |
| LIGHT DRIVER LATCH 339 | X | | 808–80F |
| LIGHT DRIVER LATCH 340 | X | | 810–817 |
| LIGHT DRIVER LATCH 341 | X | | 818–81F |
| TAPE READER BUFFER 306 | | | 012–01A |
| TAPE READER FWD LINE 321 | | X | 010=0&011=0 |
| TAPE READER REV LINE 321 | | X | 010–0&011=1 |
| TAPE READER REWIND LINE 322 | | X | 010=1&011=0 |
| USART ENABLE 298 | | X | 600–61F |
| USART ENABLE 301 | | X | 200–21F |

MAIN PROCESSOR OPERATION

Referring particularly to FIG. 2, the numerical control system of the present invention performs numerous functions, Part program data is input to the front panel processor from the tape reader 297 and is coupled through the cable 9 to the main processor. The "blocks" of part program data are stored in the main processor random access memory 29. Operator commands are also received by the front panel processor from the keyboard 14 and the switches 15. These commands are also coupled to the main processor and the microprocessor 25 processes these commands to operate the numerical control system as directed.

When the numerical control system is running a part program, the blocks of part program data are read from the random access memory 29 (128 bytes at a time). Such a block of part program data may include codes which must be decoded, dimensions which indicate the distances the cutting tool is to be moved, and numbers which indicate the feed rate at which the cutting tool is to be moved. The codes may also direct that such auxiliary functions as a tool change, pallet change, coolant on, etc. should be performed, and when these are decoded, a designated flag is set in the programmable interface image table 105 stored in the random access memory 29. The contents of the programmable interface image table 105 are periodically transferred to the programmable interface circuit 75 to indicate that the particular auxiliary function is to be performed.

The dimensions and numbers in a part program are employed by the microprocessor 25 to calculate a distance which the cutting tool is to move along each axis of machine tool motion in a single 25.6 millisecond iteration. These distances are stored in active buffers in the random access memory 29 and they are employed every 25.6 milliseconds by the microprocessor 25 under the direction of an interpolation routine to calculate the motion command signals which are output to the servomechanism interface circuit 7.

Figure 15:
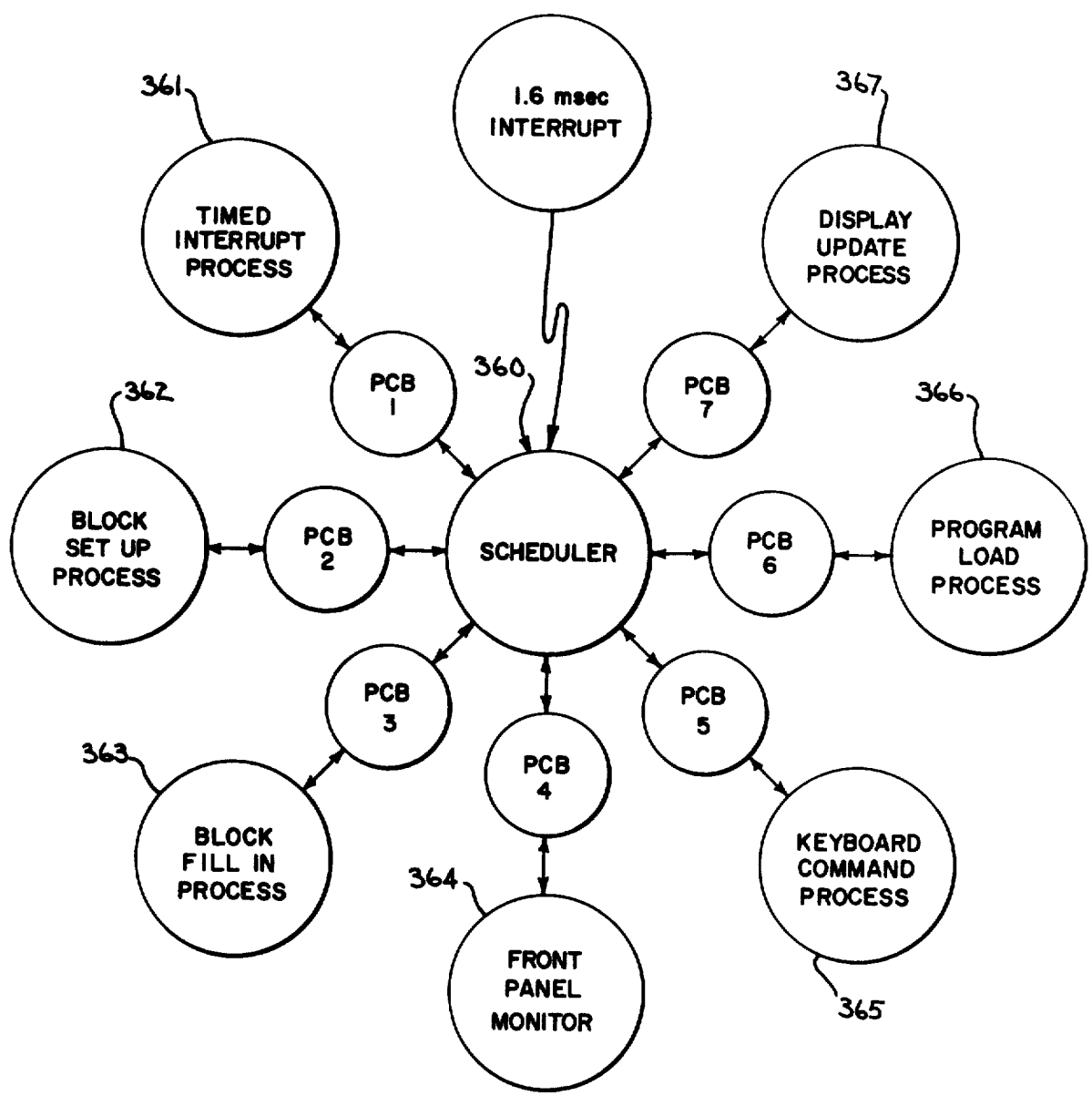
FIG. 15 is a schematic diagram of the main processor operating system.

The control of these and other functions resides in the main microprocessor 25 which operates under the direction of a scheduler routine stored in the read-only memory 30. Referring particularly to FIGS. 2 and 15, the scheduler routine, or scheduler, is indicated schematically at 360 and it is entered at least once every 1.6 milliseconds when the microprocessor 25 responds to the interrupt generated by the real time clock 50. The various functions which the main processor is to perform are collected into seven general processes and it is the function of the scheduler 360 to allocate 1.6 millisecond "time slices" to each of these processes on a round-robin basis. These seven processes are identified herein as follows: timed interrupt process 361; block set up process 362; block fillin process 363; front panel monitor 364; keyboard command process 365; program load process 366; and display update process 367. The scheduler 360 has sixteen 1.6 millisecond time slices ($16 \times 1.6 = 25.6$) which it can allocate to these processes during each iteration period. The number of allocatable time slices remaining during any 25.6 millisecond iteration period is retained in a counter (ITRS) which is stored in the random access memory 29.

Figures 16, 17, 19:
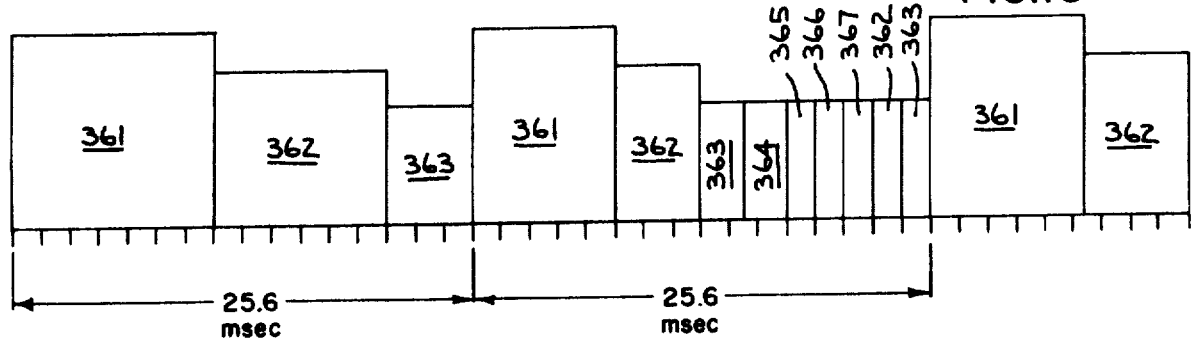
FIG. 16 is a schematic diagram illustrating the contents of a schedule queue which forms part of the system of FIG. 15.
FIG. 17 is a schematic diagram illustrating the contents of a process control block which forms part of the system of FIG. 15.
FIG. 19 is an illustration of a typical sequence of operation of the system of FIG. 15.

Referring particularly to FIGS. 15–17, the order in which the processes are executed and the number of time slices allocated to each during a 25.6 millisecond iteration period are indicated in a schedule queue 368. The schedule queue 368 is stored in the read-only memory 30 and its contents are illustrated in FIG. 16. Associated with each of the processes listed in the schedule queue 368 is a process control block (PCB) which is stored in the random access memory 29 and which contains data concerning the status of the process as illustrated in FIG. 17. The addresses of the respective process control blocks PCB1–PCB7 are stored in the schedule queue 368 and are labeled A(PCB1); A(PCB2); A(PCB3); A(PCB4); A(PCB5); A(PCB6); and A(PCB7). Associated with each of these PCB addresses is a number which indicates the maximum number of contiguous time slices allocated to the process.

A register (PCBIDX) located in the random access memory 29 is an index to the current, or active, line in the schedule queue 368. This register is employed by the scheduler routine 360 to sequentially activate the processes. For example, PCBIDX points to the first line in the schedule queue 368 at the beginning of each iteration period and the timed interrupt process 361 is thus activated through its associated process control block (PCB1). Since the timed interrupt process 361 must be executed to completion, an excessive number of time slices are allocated to it (MSC1-32). However, under normal operating conditions the timed interrupt process is completed in fewer than sixteen time slices and there will be a number of time slices remaining in each 25.6 millisecond iteration period to service other processes. When a process is completed or when it uses up its allocated time, the scheduler 360 is called and the register PCBIDX is incremented to point to the next line in the schedule queue 368. For example, after the timed interrupt process is completed, the block set up process 362 is activated through its associated process control block (PCB2) and the remaining time slices in the iteration period are used up if necessary to complete this process. The remaining processes are similarly activated when time becomes available during any iteration period in the order listed in the schedule queue 368. A dummy process (not shown in the drawings) is also included in the system in the event that no process can be executed. This dummy process is a wait loop which is executed until the start of the next iteration period.

Referring particularly to FIGS. 15 and 17, the process control blocks (PCB1–PCB7) store data which provides to the scheduler 360 the status of the respective processes 361–367. The first line of each process control block stores inhibit flags, which when set, indicate to the scheduler 360 that the process is not to be executed. More particularly, bit 0 is an inhibit flag (IOW) which is set when the process requests I/O and specifies its willingness to await completion of the I/O operation, bit 1 is an inhibit flag (CIW) which is set by the scheduler when it receives an inhibit request from the process which indicates that it is not to be executed during the present 25.6 millisecond iteration period, and bit 2 is an inhibit flag (PRW) which indicates that the process is to remain inhibited until it is reactivated, or enabled, by another process. As the scheduler 360 sequences through the schedule queue 368, it interrogates the inhibit flags in the active process control block to determine if its associated process should be executed.

The second word in each process control block (PCB1–PCB7) serves as a counter (CSC) which indicates to the scheduler the number of allocated time slices remaining before the next process on the round-robin must be activated. When a process is activated, one of the first functions the scheduler performs is to load this counter (CSC) with the number of allocated time slices indicated for that process in the schedule queue 368. Then, as 1.6 millisecond interrupts occur, the time slice counter (CSC) is decremented, and when it reaches zero, control is returned to the scheduler 360.

The remaining four lines of each process control block (PCB1–PCB7) store data which indicates the status of the process when control is returned from it to the scheduler 360. More specifically, line three stores the contents of a memory extension register (MXR), line four stores the contents of a workspace pointer (WP), line five stores the contents of a program status register (ST). This data is loaded into the process control block by the scheduler 360 when the activated process is interrupted by the 1.6 millisecond clock or whenever the process exists and is "blocked" by an inhibit bit. When the process is reactivated by the scheduler 360, therefore, the contents of these four lines in the process control block can be reloaded into the appropriate microprocessor registers and the execution of the process can continue from the point where it left off.

Figure 18A:
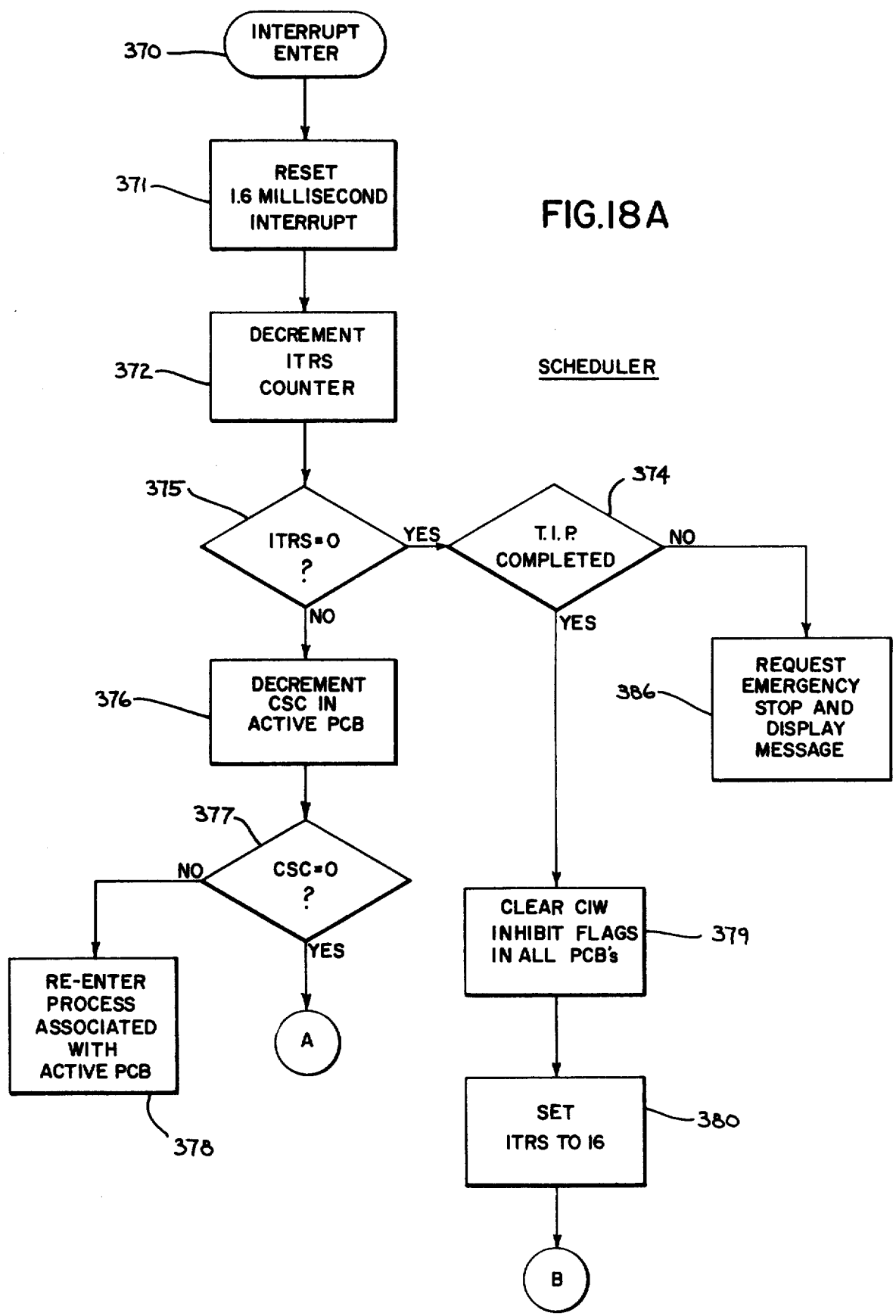
FIGS. 18A and 18B are a flow chart of the scheduler which forms part of the system of FIG. 15.
Figure 18B:
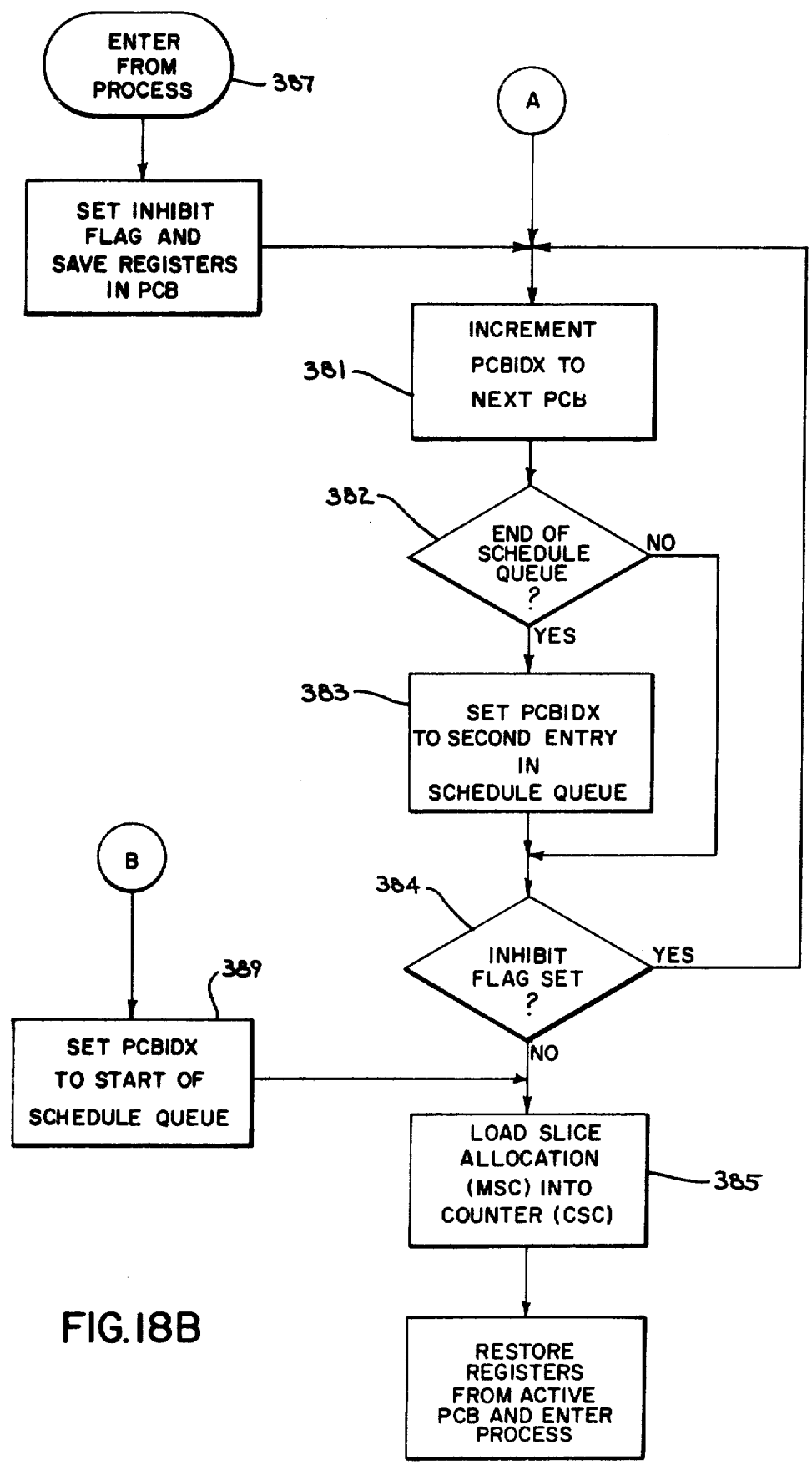

Referring particularly to FIGS. 18A and 18B, the scheduler routine 360 is entered during each 1.6 millisecond interrupt at the point 370. The 1.6 millisecond interrupt is then reset by an instruction indicated by process block 371 and the time slice counter (ITRS) is decemented one count as indicated by process block 372. The time slice counter (ITRS) is then examined as indicated by decision block 275 to determine if all sixteen time slices for the current iteration period have occurred.

If the iteration period has not expired, the counter (CSC) in the active process control block is decremented as indicated by process block 376 and it is then checked, as indicated by decision block 377, to determine if it is zero. If it is not, further time slices are available to the active process and the active process is reentered as indicated by process block 378.

If the iteration period has expired as determined by decision block 375, or if the time allocated to the active process has expired as determined by decision block 377, the scheduler 360 maintains control. When the iteration period ends a check is made to determine if the timed interrupt process (TIP) was completed during the iteration period. This is accomplished by decision block 374 which branches to an emergency stop routine indicated by process block 386 when an "overlap" has occurred. Under normal operating conditions, however, the inhibit flag CIW in all of the process control blocks PCB1-PCB7 are reset as indicated by process block 379 and the time slice counter (ITRS) is set to sixteen as indicated by process block 380 to start a new iteration period. As shown in FIG. 18B, the PCBIDX register is set to the start of the schedule queue 368 as indicated by process block 389 and the timed interrupt process is entered and executed to completion. The timed interrupt process is thus executed at the beginning of each iteration period.

Referring to FIG. 18B, when the iteration period has not ended, but the next process in the schedule queue 368 is to be activated, the register PCBIDX is incremented as indicated by process block 381 to point to the next process control block listed. If the end of the schedule queue has been reached as determined by decision block 382, and time remains in the iteration period, the register PCBIDX is reset to point to the second entry in the schedule queue 368 as indicated by process block 383. In either case, the next process control block is now active and the first function performed by the scheduler 360 is to examine the first line in the active process control block to determine if any inhibit flags are set. If so, as indicated by decision block 384, the scheduler 360 loops back to process block 381 to determine if the next process listed in the schedule queue 368 should be activated. As indicated by process block 385, if no inhibit flags are set, the time slice allocation (MSC) for that purpose is read from the schedule queue 368 and loaded into the counter (CSC) of the active process control block. The active process is then entered and executed until it requests "blocking" or until the next 1.6 millisecond interrupt occurs.

Referring particularly to FIG. 18B, when a process is completed before a 1.6 millisecond interupt occurs, the scheduler routine 360 is entered at the point 387. The appropriate inhibit flag is set for that purpose and the contents of the microprocessor registers are saved in the process control block associated with the completed process as indicated by process block 388. The register PCBIDX is then incremented as described above to point to the next line in the schedule queue 368 and the next "unblocked" process will be activated and will use the remaining time in the current time slices.

The timed interrupt process 361 will be executed to completion during each iteration period because it is allocated more time slices than it can possibly use when the system is operating properly. The block set up process 362 will utilize a large portion of the remaining time in the interpolation period until it has completed its function of setting up the next part program block for interpolation. After that the block set up process 362 is dormant and will be entered after the completion of the timed interrupt process 361 just long enough to check whether the endpoint of the current part program block has been reached. Considerable time is then available during each iteration period and this is allocated to the remaining "background" processes listed in the schedule queue 368. A typical allocation of time slices by the scheduler 360 is illustrated schematically in FIG. 19 for three iteration periods immediately following the transfer of a new block of data into the active interpolator buffer. The timed interrupt process 361 occupies a substantial portion of each iteration period, but the time required by the block set up process diminishes after the first iteration period. Subsequent interation periods will be similar to the second period illustrated in FIG. 19 until the end of block is detected and the block set up process 362 again requires substantial time.

It should be apparent that the scheduler 360 provides a flexible and efficient means of allocating time to the various functions which the main processor must perform. Processes, and hence functions, may be added or deleted from the system merely by making additions or subtractions from the schedule queue 368. Priorities can be altered by changing the order of the schedule queue entries of the time slice allocations.

Figure 20A:
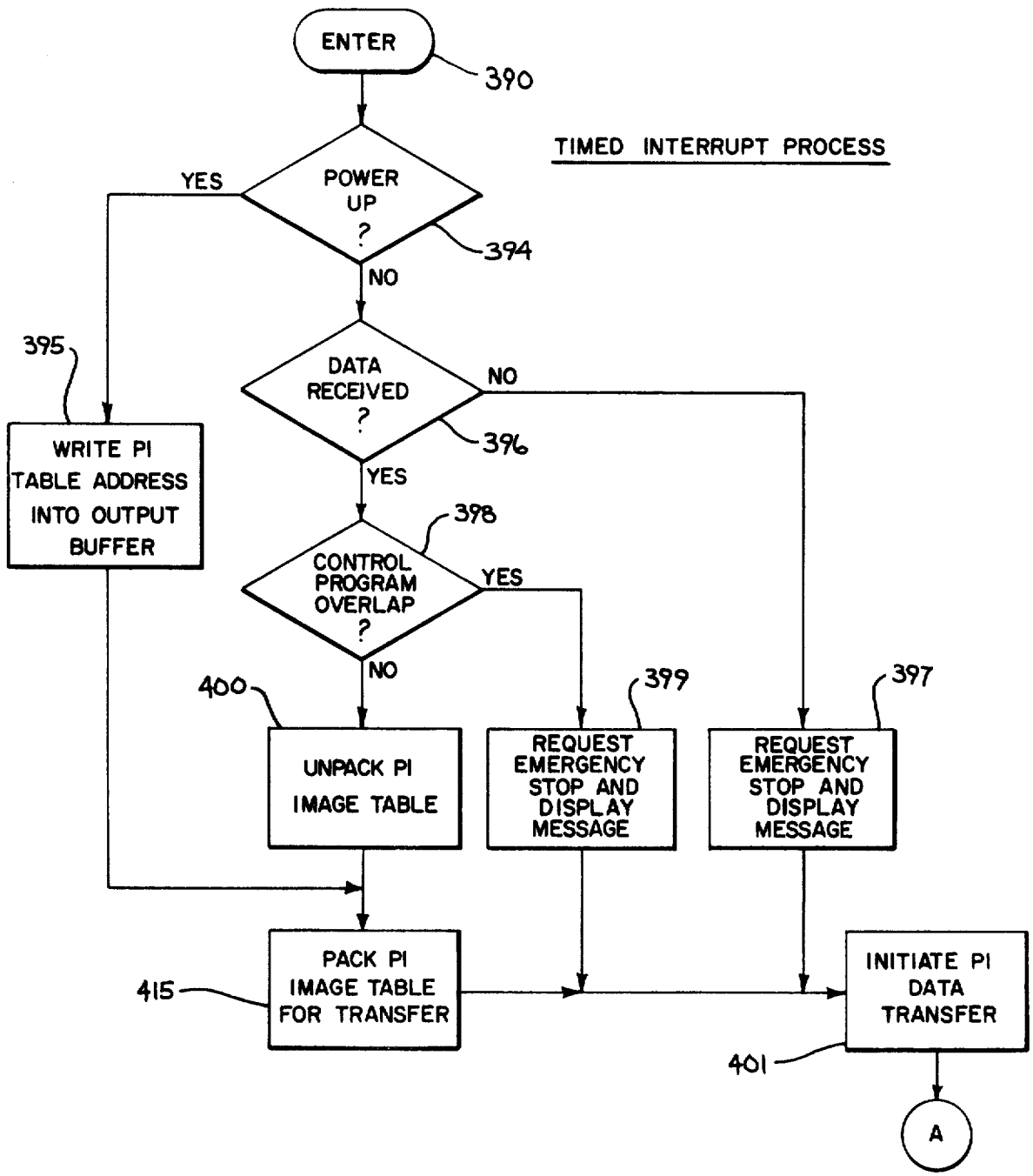
FIGS. 20A and 20B are a flow chart of the timed interrupt process which forms part of the system of FIG. 15.

Referring to FIGS. 2, 15 and 20, the timed interrupt process functions to output motion commands to the servo-mechanism interface circuits 7 and to exchange data with the programmable interface circuit 75 once during every 25.6 millisecond iteration period. Referring particularly to FIG. 20A, the timed interuupt process is entered from the scheduler 360 at the beginning of each interation period at the point 390. The first function it performs is to determine if the system is being powered up, as indicated by decision block 394. If the system is in power up, the starting address of the programmable interface image table 105 in the random access memory 29 is written to the programmable interface circuit 75. This enables the programmable interface circuit 75 to address the proper memory address so that it can subsequently exchange data with the programmable interface image table 105.

After power up, the timed interrupt process prepares to initiate a data transfer with the programmable interface circuit 75. First, it checks to see whether data was received from the programmable interface circuit 75 during the previous iteration period, as indicated by decision block 396. If not, a malfunction has occurred and the system branches to a process block 397 requests an emergency stop and loads an appropriate message into a display buffer for transmittal to the front panel processor. Otherwise, the system checks a control program overlap flag as indicated by decision block 398 to determine if the programmable interface processor completed its functions during the previous iteration period. If it did not, an emergency stop is requested and a suitable message is displayed as indicated by process block 399. The "data received" and "control program overlap" indicators are stored in the programmable interface image table 105. They are set by the programmable interface circuit 75.

Under normal circumstances, instructions indicated by process block 400 are executed next to unpack data written into the programmable interface image table 105 by the programmable interface circuit 75 during the previous iteration. This data is dispersed to various locations in the random access memory 29 for use by other programs.

Next, data is assembled from various locations in the random access memory 29 and stored at specified locations of the programmable interface image table 105 as indicated by process block 415. Such data may be generated by the block set up process from the part program and may include, for example, an indication that an auxiliary function such as a tool change or a pallet change is to occur. After this data has been assembled in the PI image table 105, an instruction indicated by process block 401 is executed by the main processor to initiate the data transfer between it and the programmable interface circuit 75. As indicated previously, this instruction generates a non-maskable interrupt to the programmable interface microprocessor 85. The programmable interface circuit 75 subsequently requests a DMA from the main microprocessor 25 and the main microprocessor 25 releases its data bus 27, address bus 26, and control lines WE and RD to the programmable interface circuit 75. The programmable interface 75 then transfers thirty-three 16-bit words of data from the PI image table 105 in the main processor memory 29 to the programmable interface circuit 75. Later, during the same iteration period, the programmable interface circuit 75 transfers thirty-three 16-bit words of data back to the PI image table 105 in the memory 29.

Figure 20B:
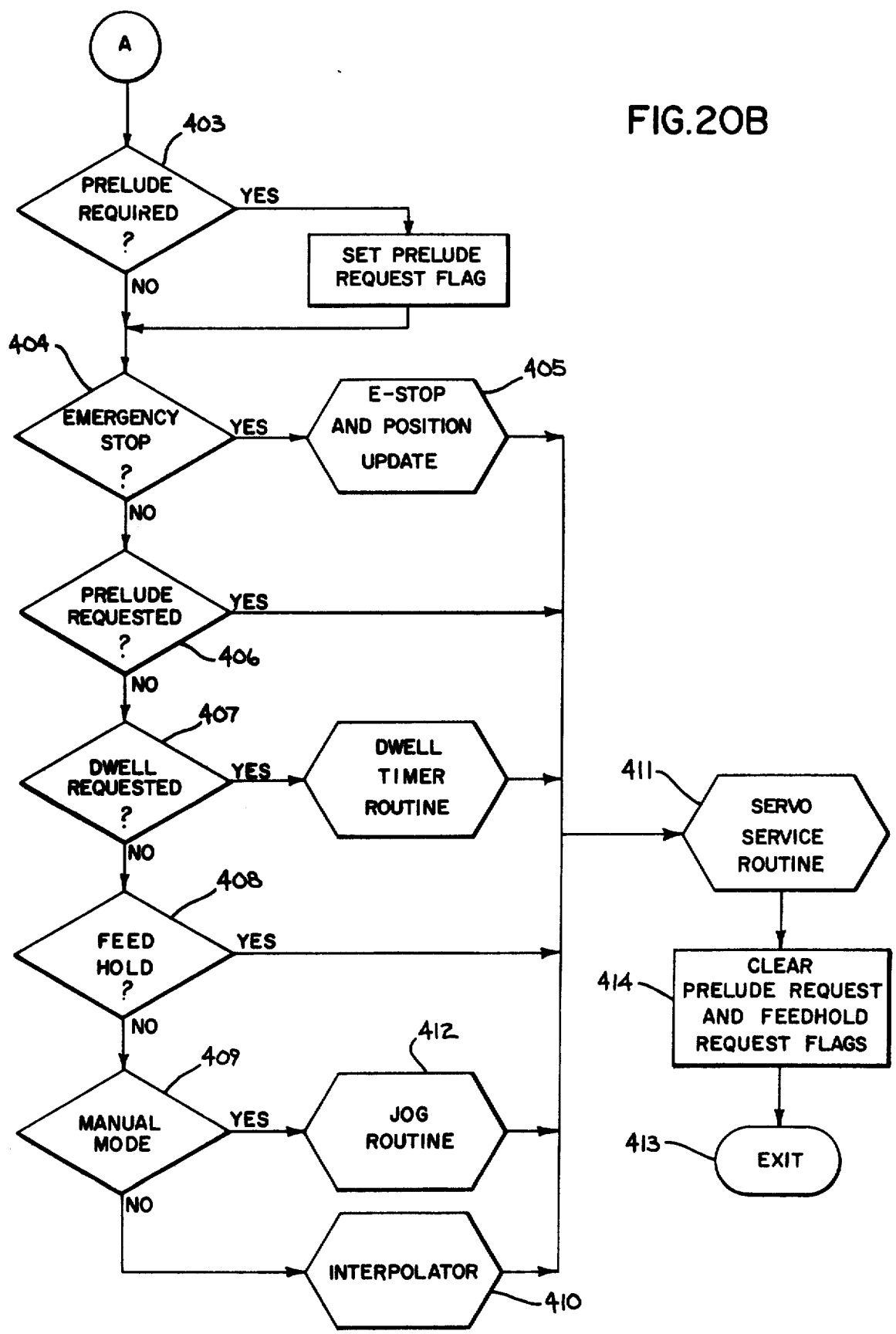

Referring particularly to FIG. 20B, after the exchange of data with the programmable interface circuit 75 has been initiated, the main processor continues to execute instructions in the timed interrupt process. The next step in this process is to determine if a "prelude" flag has been set as indicated by decision block 403. A prelude is always requested during the first iteration period of any part program block which contains an S-word, a T-word, or certain M codes defined in EIA standard RS-274-C. This gives the programmable interface circuit 75 an opportunity to act on the S, T or M code at the beginning of the block before interpolation begins.

The system next executes instructions indicated by decision block 404 to determine whether the emergency stop flag has been set. If so, an emergency stop and position update routine 405 is executed. Otherwise, the prelude flag is checked at decision block 406 and the "dwell" flag is checked at decision block 407. If neither of these flags is set the "feed hold" flag is checked at decision block 408 and the "manual mode" flag is checked at decision block 409.

If none of these flags are set the interpolation routine 410 is entered and is executed to its completion to generate an incremental motion command number for each axis of motion on the machine tool being controlled. A servo-service routine 411 is then executed to output the motion command signals to the servo-mechanism interface circuit 7 as indicated at 411. If the interpolator 410 is bypassed, either no incremental motion command numbers are calculated, or motion command numbers are calculated by a jog routing 412 which is responsive to operator commands. In any case, after the newly calculated motion commands are output to the servo-mechanism interface circuit 7, the prelude request and feedhold request flags are reset as indicated by process block 414 and the system exits at 413 back to the scheduler 360.

Figure 21A:
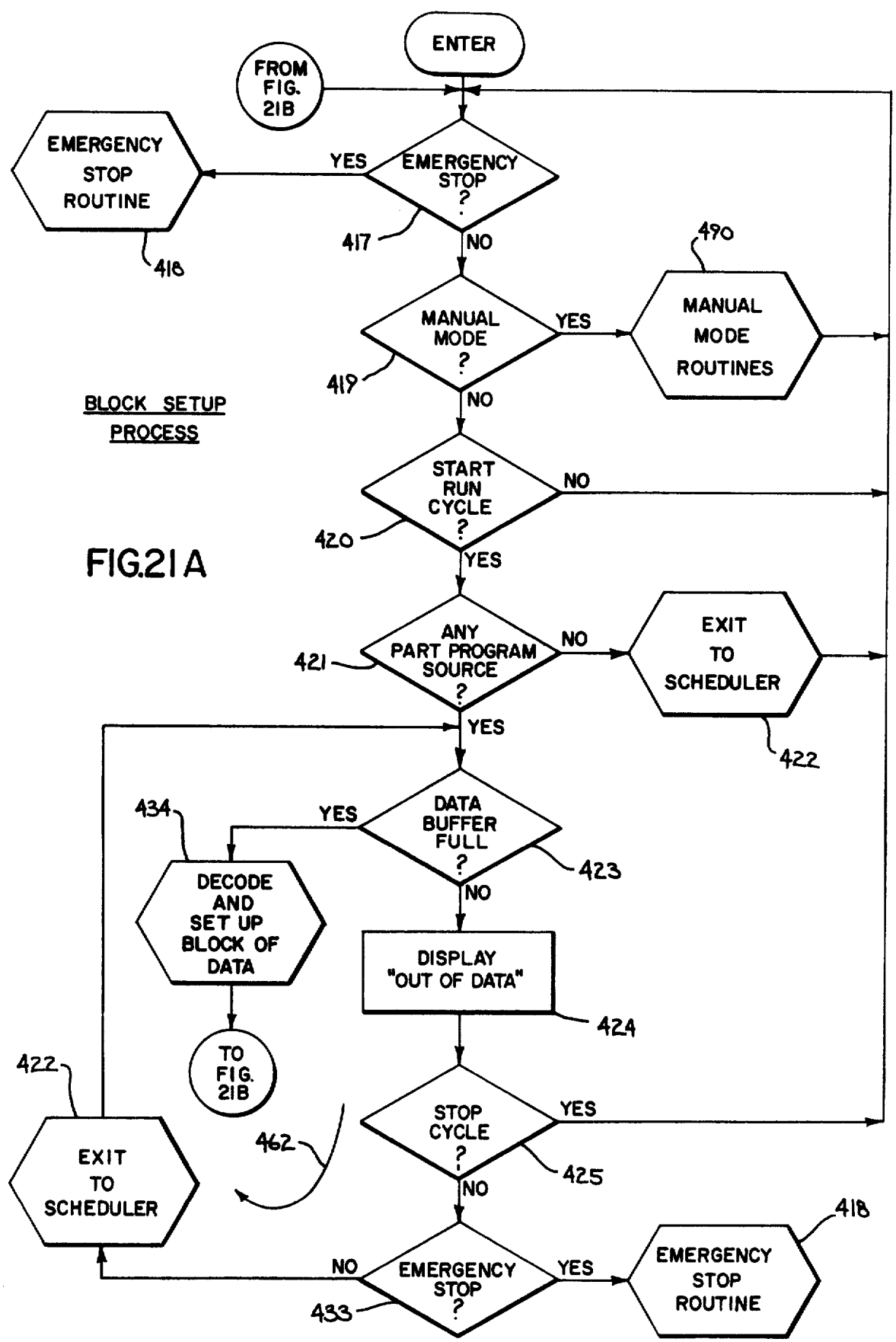
FIGS. 21A and 21B are a flow chart of the block set up process which forms part of the system of FIG. 15.
Figure 21B:
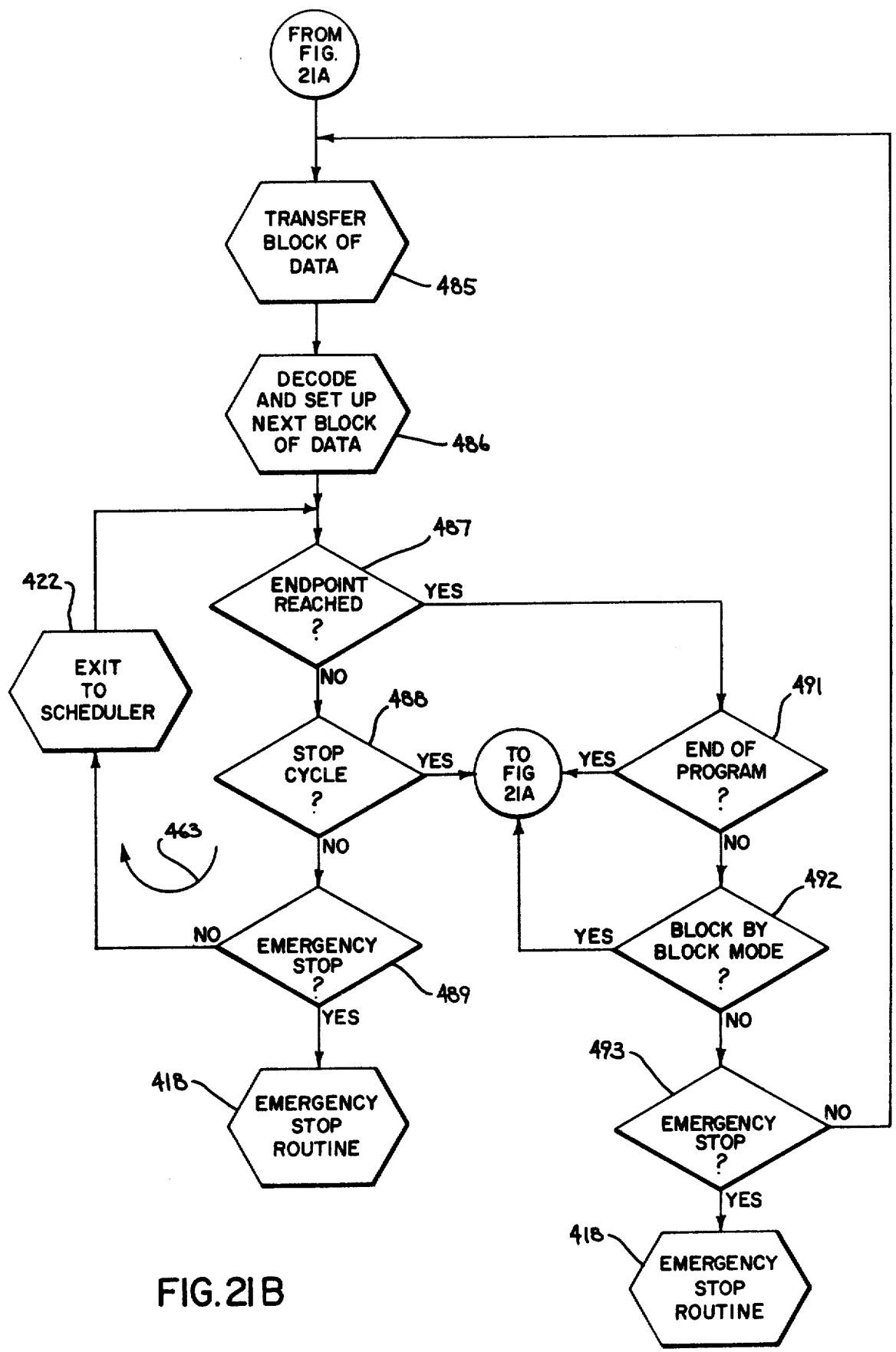

The next process in the schedule queue 368 is the block set up process 362 which is illustrated by the flow chart in FIGS. 21A and 21B. This process takes a block of part program data from a "block data buffer," decodes the ASCII characters into binary axis commands, feed rate commands and flags. This decoded data is then employed to calculate the values needed for the interpolator routine, such as distance to go, speed and the initial values of I, J and K for circular interpolation. These interpolator values are stored in a "temporary interpolator buffer" until the previous block of data has been completely interpolated, at which point, the block set up process makes the temporary interpolator buffer "active" and it begins to set up the next part program block in the temporary interpolator buffer. The part program data processed by this routine is placed in the block data buffer by the block fill-in process 363. As will be described in more detail hereinafter, the block fill-in process 363 detects command blocks, and hence, these are not passed on to the block set-up process 362. Instead, commands are passed to a command handler which decodes the commands and executes them.

Referring particularly to FIG. 21A, the block set-up process first executes a series of instructions which determine whether part program data is available and whether that data should be set up and applied to the interpolator routine. More specifically, a test is first made to determine whether an emergency stop has been requested as indicated by decision block 417 and then the status of the mode switch is checked as indicated by decision block 419 to determine if manual mode has been selected. If an emergency stop has been requested, the system branches to an emergency stop routine 418 and if manual mode has been selected, the system branhes to the appropriate manual mode routine indicated collectively at 490. As indicated by decision block 420, instructions are executed next to determine whether the cycle start button has been depressed. If it has, instructions indicated by decision block 421 are executed to determine if a source of part program data has been identified by the operator. If a source of data has not been identified, the process exits back to the scheduler routine through a routine indicated at 422. The routine 422 requests "blocking" and the scheduler sets the CIW inhibit flag in the process control block associated with the block set-up process. The scheduler also loads data into the other locations of the process control block which will cause the block set-up process to be re-entered at its beginning during the next iteration period.

After a source of part program data has been identified by the operator, the system leaves the loop formed by decision block 421 and executes instructions indicated by decision block 423 to determine whether the "block data buffer" has been filled with part program data. If not, a message is outputt to the pendent station display as indicated by process block 424 and instructions indicated by decision blocks 425 and 433 are executed to determine if the cycle stop push button has been depressed by the operator of if an emergency stop has been requested. If neither of these requests have occurred, the system exits back to the scheduler through the routine 422, which sets the CIW inhibit flag and conditions the process control block to re-enter the block set-up process at decision block 423 during the next iteration period. During subsequent iterations the block set-up process will be entered too determine whether the data buffer is full and will loop back to the scheduler as indicated by the arrow 462.

When the block data buffer is full, as determined by decision block 423, the system brances to a decode and set-up routine 434 which analyzes the part program instruction and converts the data into a form which is usable by the interpolator routine. Referring particularly to FIG. 21B, this converted data is stored in the active interpolator buffer as indicated by routine 485 and then the next block of part program data is analyzed and set up in the temporary interpolator buffer as indicated by routine 486. The block set-up process then enters a loop indicated by the arrow 463 while the data in the active interpolator buffer is processed by the interpolator routine during subsequent iteration periods. This loop 463 includes a set of instructions indicated by decision block 487 which tests whether the end point of this block of data has been reached and an instruction indicated by decision block 488 which determines whether cycle stop has been requested. Also, the emergency stop request flag is checked by instructions indicated by decision block 489 and if none of these requests have occurred, the system exits back to the scheduler through the routine 422 which sets the CIW inhibit flag in the process control block.

When the end point of the current part program block has been reached as determined by decision block 487, an instruction indicated by decision block 491 is executed to determine whether the end of the program has been reached. In additon, instructions indicated by decision block 492 are executed to determine if the machine is in the "block by block" mode of operation. If either condition is present, the system branches back to the beginning of the block set-up process in FIG. 21A. Otherwise, an instruction indicated by decision block 493 is executed to determine if an emergency stop is required, and if not, the system branches back to the routine 485 to transfer the temporary interpolator buffer data to the active interpolator buffer and to decode and set up the next block of data in the temporary interpolator buffer.

As described above, when the block set-up process reaches a point where it is waiting for an event to occur, or is waiting for data to become available, it exits back to the scheduler which sets an inhibit flag in the associated process control block (PCB2) to insure that the process is not entered until the next iteration period. In addition, however, the block set-up process may be interrupted by the 1.6 millisecond clock at any point in the program. This will occur, for example, when the decode and set-up routine 486 is being executed since it requires more than 1.6 milliseconds of time. As described above, when such an interrupt occurs, the status of the microprocessor or registers are saved in the process control block (PCB2) so that the block set-up process will be re-entered at the same point during the same or subsequent iteration period.

Figure 6:
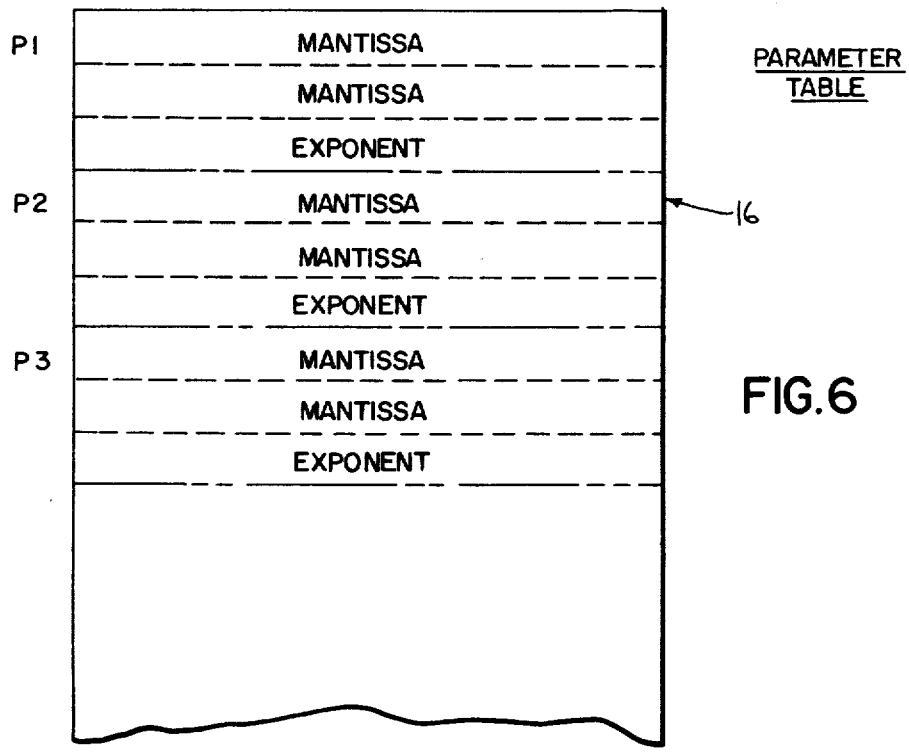
FIG. 6 is a schematic representation of the detailed structure of the parameter table which forms part of the present invention.

When the decode and set-up routine encounters a parameter in a block of part program data, the present value of the parameter is retrieved from the parameter table 16. As shown in FIG. 6, the parameter table 16 stores all parameters, each of which occupies three words of memory. The first two words of each parameter entry contain a binary number which represents the mantissa, and the third word stores the exponent. As will be described in more detail hereinafter, these floating point, binary parameter values are assigned by a "PAR" command and a "CLS" command contained in the part program or entered through the keyboard 14.

When a block of part program data contains a single parameter as one of its elements, the value from the parameter table 16 is merely substituted for it during the decode and set-up process. It is a feature of the present invention, however, that the part program element may be specified by an arithmetic expression. Such an expression is comprised of a constant, or a parameter, or a series of constants and parameters separated by arithmetic or special operators. The following operators are recognized:

| | | | |
|---|---|---|---|
| + | addition | S | sine function |
| − | subtraction | C | cosine function |
| / | division | T | tangent function |
| * | multiplication | A | arctangent function |
| v | square root | | |

Examples of part program blocks containing expressions are as follows:

N05G,P1/2+P2,X20F10#  Z
N162X,P2/3 −.25+(P1/(P3−.1)),10F2# where: commas separate the elements and "#" is an end of block terminator.

The values of parameters P1, P2, P3 in the above examples, are presumed to be assigned when the part program blocks are set-up. At decode time, therefore, the parameter expressions are evaluated using these assigned parameter values from the table 16 and the result (for example a dimension) replaces the parameter expression prior to passing the block to the interpolator. This function is performed by a parameter expression evaluation routine which will be described in more detail hereinafter.

Referring to FIG. 15, the block fill-in process 363 is similar to the block set-up process 362 in the general manner in which it interacts with the remainder of the syste. Its primary function is to transfer blocks of part program data from designated locations in the random access memory 29 to the block data buffer for processing by the block set-up process 363 described above. While performing this function, however, the block fill-in process 363 looks for command blocks within the part program, and when found, calls a command handler program. Command blocks are not passed on to the block set-up process 362.

Figure 4:
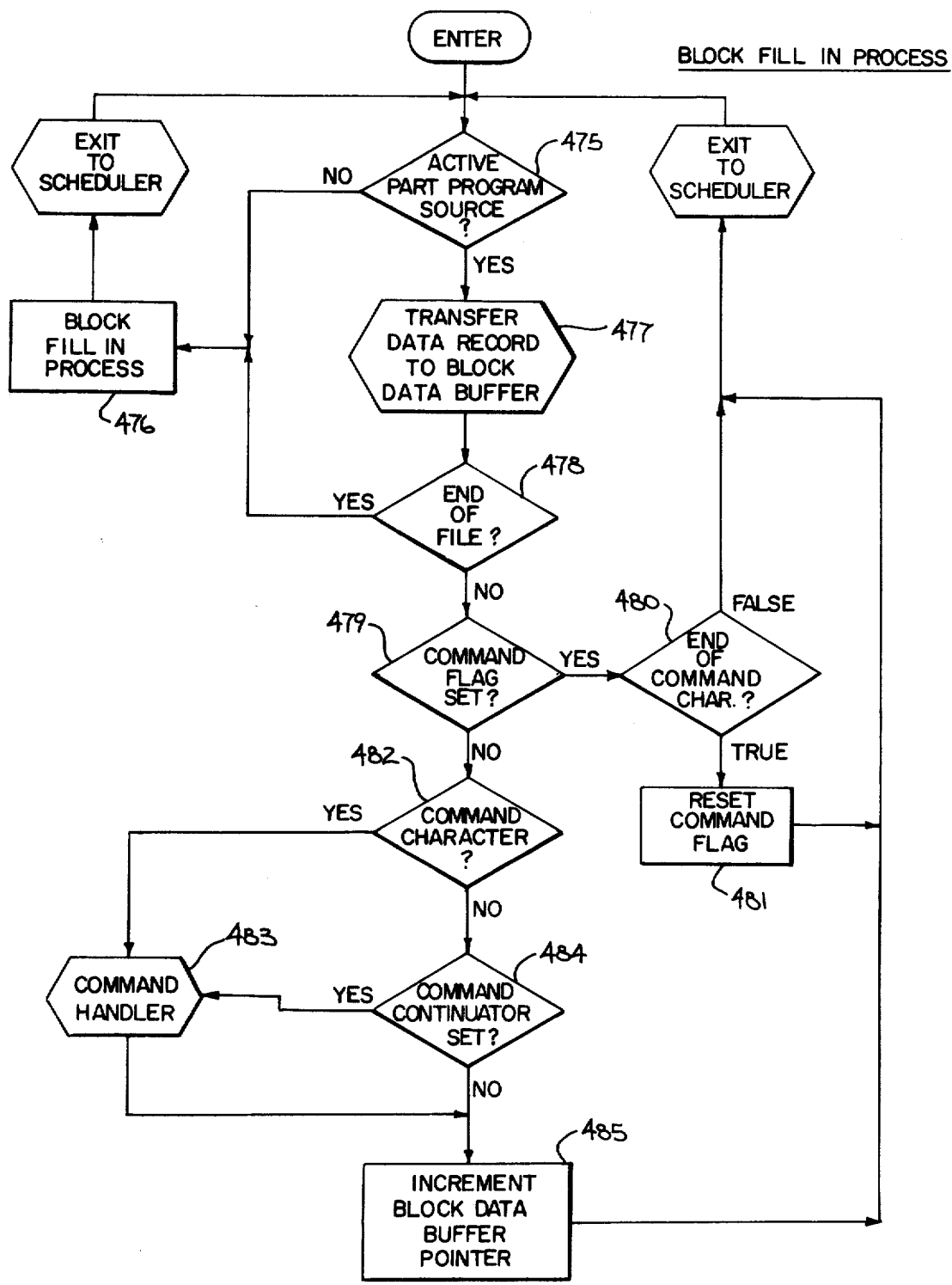
FIG. 4 is a flow chart of the fill-in process which forms part of the system of FIG. 15.

Referring particularly to FIG. 4, the block fill-in process 363 first executes instructions indicated by decision block 475 to determine if a part program is acitvely being executed. If not, the process branches to a set of instructions indicated by process block 476 to set the CIW inhibit flag in the associated PCB3 and to exit back to the scheduler. Otherwise, the next part program data record is transferred to the block data buffer as indicated by process block 477 and this data is examined for the end of file mark. If the end of file has been reached, as determined at decision block 478, the process branches to process block 476 to inhibit the block fill-in process until further part program data is provided. Otherwise, instructions indicated by decision block 479 are executed to determine if the command flag is set. If so, this indicates that the current record is a continuation of a command block and the process branches to decision block 480. Continuation records are thus transferred until the entire command block resides in the block data buffer, and when the end of command character (")" ) is detected at decision block 480, the command flag is reset, as indicated at process block 481, before exiting to the scheduler.

Referring still to FIG. 4, command blocks contained in part programs are characterized by a "(" in the first character position. In the preferred embodiment of the invention such commands include the following:

(PAR,P1, −2,P3,4,−)

(CLS,NAME,P1, −2,P3,4—)
(MSG,NAME//DESCRIPTION//UNITS)

"PAR" is the mnemonic for a parameter assignment command, "CLS" is the mnemonic for a call to a canned cycle, and "MSG" is the mnemonic for a message, or comment, command. These commands will be described in more detail hereinafter. The command character is detected at decision block 482 and control is passed to a command handler routine 483 to decode and execute the command.

When the command requires more than one record, the command handler sets the command flag to indicate that further data is required to complete the execution of the command. In additon, a command continuation flag is set along with a pointer which indicates where the command handler is to be re-entered when the entire command has been transferred. This condition is sensed by decision block 484 during a subsequent iteration period and the process re-enters the command handler 483 to complete execution of the command. After a block of part program data has been transferred to the block data buffer a pointer to the next block is incremented, as indicated by process block 485 and the process exits back to the scheduler.

Figure 22:
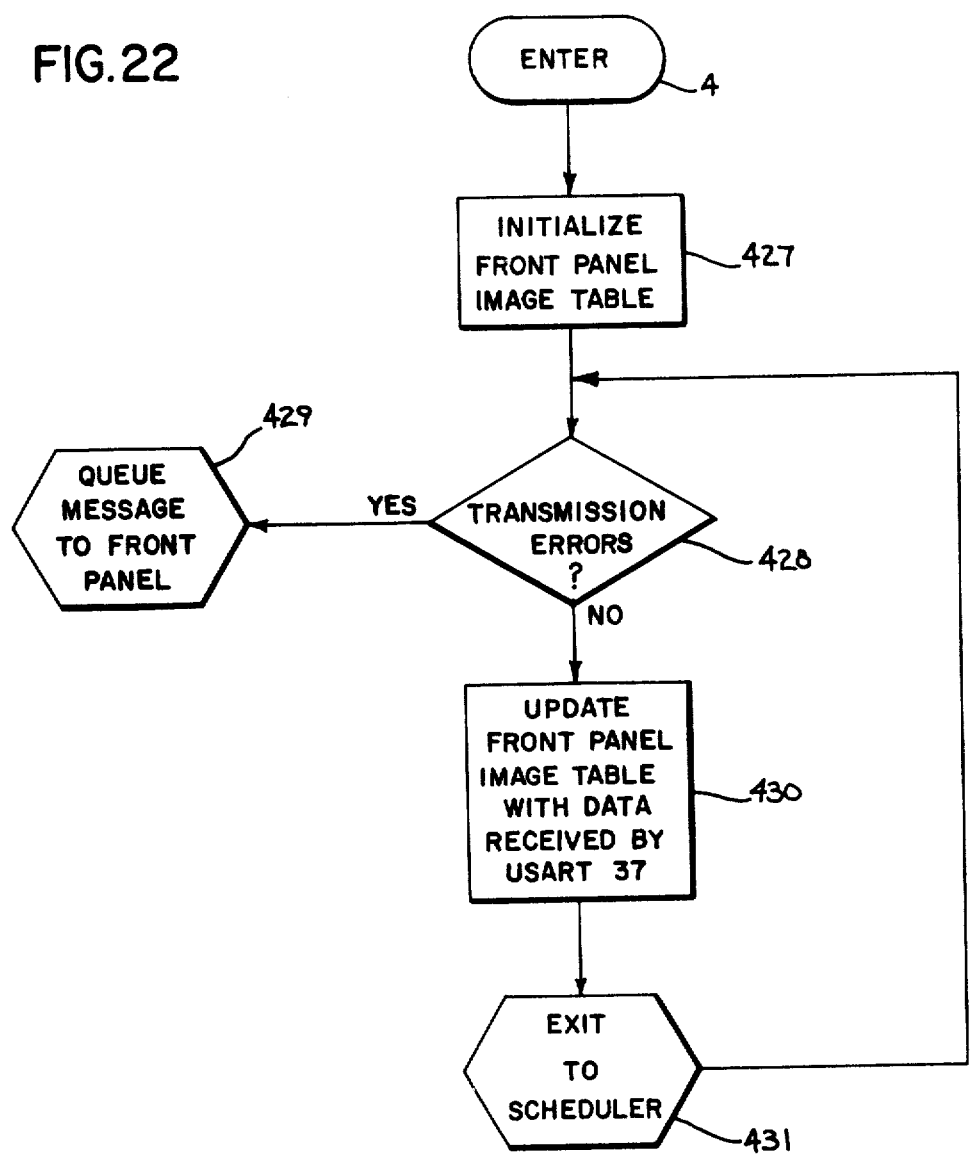
FIG. 22 is a flow chart of the front panel monitor which forms part of the system of FIG. 15.

Referring to FIGS. 2, 15 and 22, the front panel monitor 364 is the next process listed in the schedule queue 368. It functions to input data received from the front panel processor and maintain a front panel image table 444 in the main processor memory 29 which indicates the status of the lights, switches and push buttons on the pendent control station 2. When a byte of data has been received by the USART 37 which indicates that a change has occurred at the pendent control station, the microprocessor 25 inputs the data and stores it in a data buffer associated with the front panel monitor. Three such bytes of data comprise a complete message transmission and when the third byte of data has been received, the front panel monitor 364 is "unblocked" by the communications module associated with the USART 37. The front panel monitor 364 may then be activated by the scheduler.

When the scheduler 360 activates the front panel monitor 364 it is entered at the point 425. Instructions indicated by process block 427 are then executed to initialize the front panel image table 444 to a start-up condition. A flag is then checked as indicated by decision block 428 to determine if any transmission errors have been reported by the communications module. If so, the data is ignored and the system branches to a subroutine 429 which prepares a message for transmission to the front panel processor indicating the error. Otherwise, the two bytes of status data are loaded into the front panel image table 444 as indicated by process block 430. The system then exits to the scheduler at 431 with its process control block (PCB4) set for re-entry at decision block 428 when the next complete message is received. In addition, the CIW inhibit flag is set to insure that the front panel monitor 364 is not re-entered during the same iteration period. This enables the timed interrupt process to act upon the changed line in the front panel image table 444 at least once before the data can be changed again by another transmission from the pendent control station 2.

Referring to FIGS. 1, 2 and 7, it should be apparent that the front panel image table 444 serves as an interface between the pendent control station 2 and the remainder of the numerical control system. For example, four of the switches 15 on the pendent control station 2 are set by the operator to establish the manner in which the system is to operate—that is, manual, automatic, keyboard, or single block. Specific bits on one line of the front panel image table 444 are dedicated to indicate the status of these switches and it is these which are examined by processes in the front panel processor to establish the mode of operation. It is one of the functions of the front panel processor to periodically check the status of the pendent control station switches 15 and to update the main processor with any changes that occur. Only changes are transmitted to the main processor through the cable 9, thus reducing the traffic.

Figure 23:
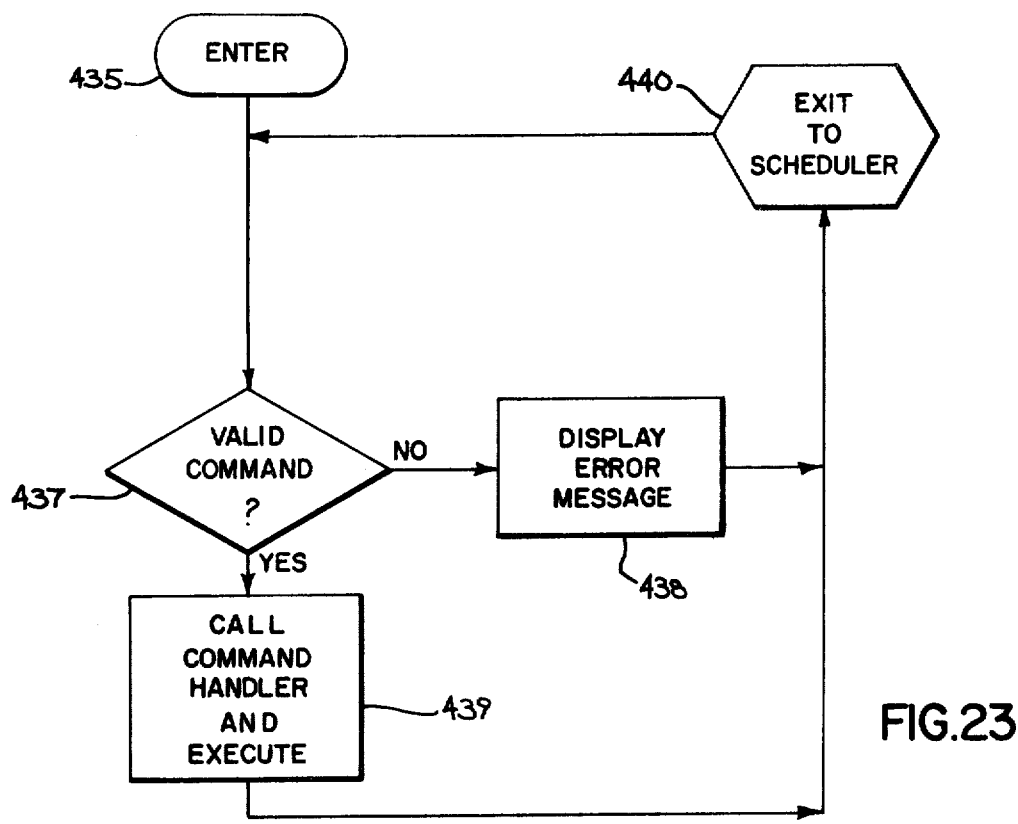
FIG. 23 is a flow chart of the keyboard command process which forms part of the system of FIG. 15.
Figure 24:
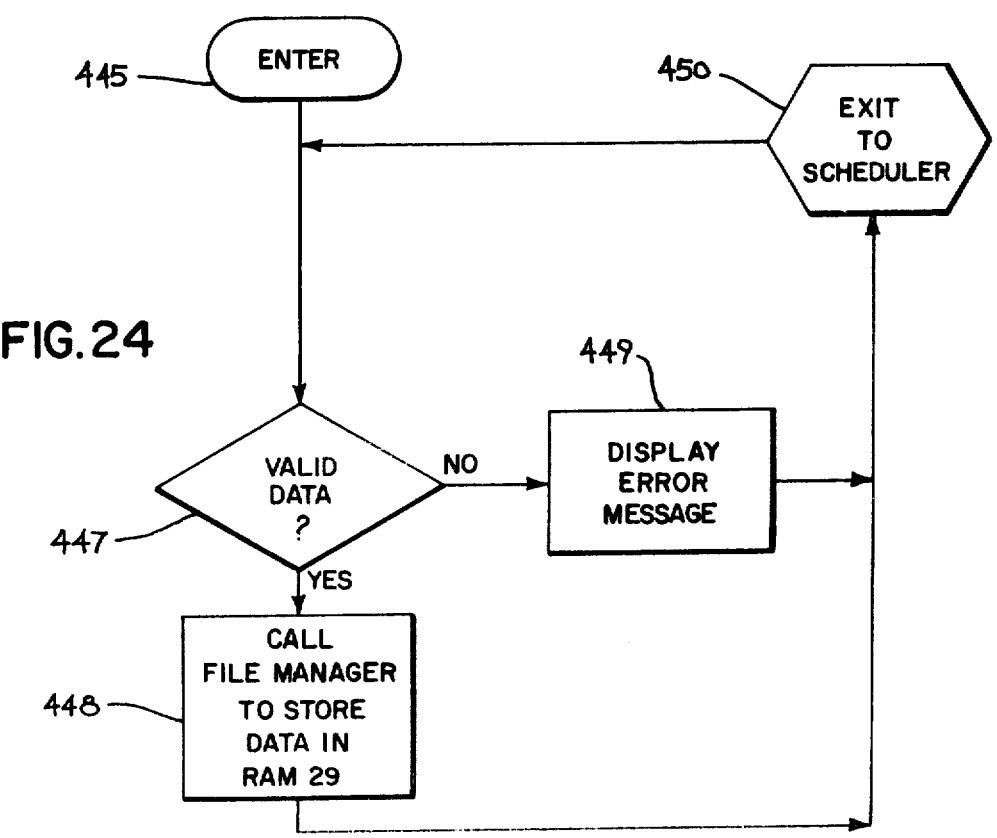
FIG. 24 is a flow chart of the program load process which forms part of the system of FIG. 15.

Referring particularly to FIGS. 2, 15 and 23, the keyboard command process 365 is listed next in the schedule queue 368 and it is entered from the scheduler 360 at a point 435 for a single 1.6 millisecond time slice when an operator command has been received from the front panel processor and is reported by the communications module (i.e., the IOW inhibit flag in PCB5 is cleared). A series of instructions indicated by decision block 437 are then executed to determine if the command is valid and if it can be executed. The command format, or command mnemonics, include those defined by EIA standard RS-447 (i.e., Operation Command and Data Format For Numerically Controlled Machines) as well as those needed to implement the present invention. A check is made to determine if the command is valid and if the system is configured to execute the command. If it is, the appropriate command handler program 483 is called up and executed as indicated by process block 439. As will be described in more detail hereinafter, such keyboard commands include those which assign values to parameters in the parameter table and those which call for the display of current parameter values. If the operator command is not correct or cannot be executed, the system branches at decision block 437 and an appropriate error message is generated for the pendent station display 16 or 17 as indicated by process block 438. The system then exits back to the scheduler 360 through the subroutine 440.

Referring particularly to FIGS. 2, 7, 15 and 24, the program load process 366 is executed when part program data is loaded through the pendent control station 2 for storage in the main processor memory 29. Typically, such data is entered through the tape reader 297 which connects to the pendent control station 2, although it also may be downloaded from a host computer in a DNC system through the front panel auxiliary USART 294. In either case, when the program load process 366 is entered from the scheduler 360 at a point 445, the data is checked as indicated by decision block 447 to determine if it is valid. If invalid, a suitable message is output to the display 16 or CRT 17 as indicated by process block 449, and if valid, the file manager is called up and executed as indicated by process block 448. When the data has been stored in the proper location by the file manager, the system exits back to the scheduler 360 through the subroutine 450. The subroutine 450 requests the scheduler 360 to load the process control block (PCB6) with data that causes the program load process 366 to be re-entered at 445 when the process is again activated.

Referring particularly to FIGS. 1, 2, 15 and 3, the display update process 367 is entered from the scheduler 360 at 455 and when executed, it functions to assemble all data to be transmitted to the pendent control station 2 in a transmit buffer. A set of instructions indicated by decision block 456 are executed first to determine if any messages are to be displayed. This is accomplished by examining the contents of eight message command blocks into which any routine executed by the main processor may deposit a message command. Two message command blocks are reserved for operator alert messages, and the remaining six are reserved for machine status messages. Many of these are "canned" messages in which only a message number is transmitted to the front panel processor.

As indicated by process block 456, if a message command is present a set of instructions are executed to load the message into a "transmit buffer" and to set a XMIT flag. A set of instructions indicated by decision block 458 are then executed to determine if a new block of part program data has been transferred to the active interpolator buffer. If so, a set of instructions indicated by process block 459 are executed to assemble and load into the transmit buffer data relevant to the new part program block such as M, G, F, S and T words and G92 offsets. Then, as indicated by decision block 460, the status of a 250 millisecond clock is checked to determine if it has timed out. If it has, instructions indicated by process block 461 are executed to load axis position data, axis following error data, endpoint data and offset data into the transmit buffer. This data is continuously changing and it is transmitted only four times per second to the pendent control station 2 so that the serial data link is not overloaded. When the 250 millisecond timer has not timed out as determined at decision block 460, the XMIT flag is checked at decision block 464 to determine if the contents of the transmit buffer are to be transmitted. If so, a communication routine is called as indicated by the process block 453, and the contents of the transmit buffer is output to the USART 37 and serially transmitted to the pendent control station 2 through the cable 9.

If no data is to be transmitted or when the transmission of the first byte of data is completed, the system exits back to the scheduler 360 through a subroutine 452 which loads the display update process control block (PCB7) with data that causes re-entry at point 455 when the process is reactivated.

COMMAND HANDLER

Figure 5:
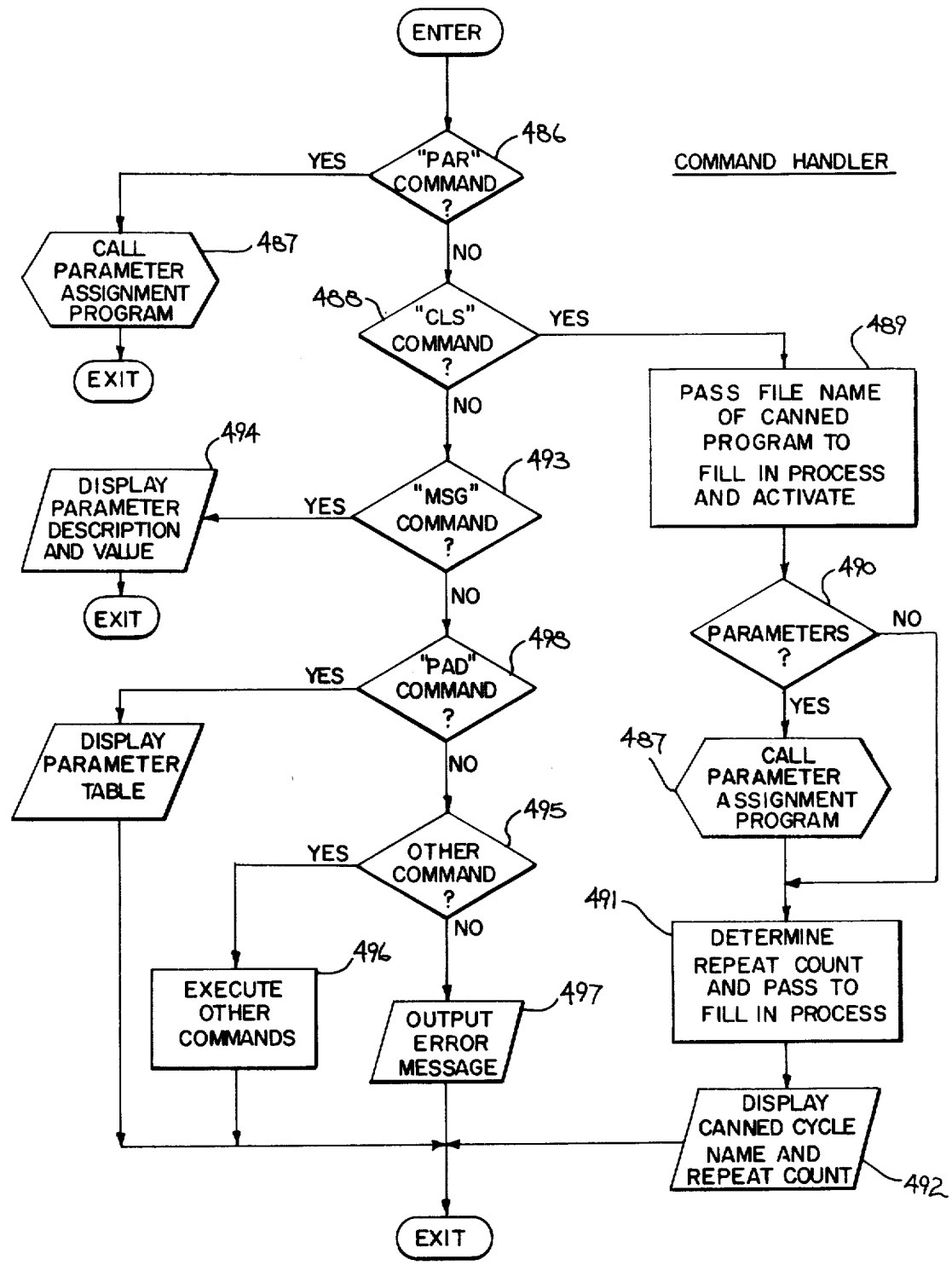
FIG. 5 is a flow chart of the command handler process which forms part of the system of FIG. 15.

Referring particularly to FIGS. 23, 4 and 5, commands which are entered through either the keyboard 14 or the part program are processed by the command handler program 483. When entered, the command handler 483 examines the command mnemonic characters to determine which command is to be executed. If it is a "PAR" command, as determined at decision block 486, the process branches to parameter assignment program 487 which evaluates the command and makes any necessary expression calculations and parameter table entries. A listing of the parameter assignment program 487 is provided in Appendix A. After the parameter assignments have been made, the command handler program 483 returns to the calling program.

When a "CLS" command is processed, it is detected at decision block 488 and a set of instructions indicated by process block 489 are executed. The file name of the canned cycle which is identified in the command is passed to the fill-in process and made active so that part program blocks from the canned cycle are processed. A pointer to the next part problem block to be executed after the canned program is completed is also saved, and instructions indicated by decision block 490 are executed to determine if the CLS command contains any parameter assignments. If so, the parameter assignment program 487 is called to evaluate expressions and make the changes to the parameter table. In any case, the CLS command is then analyzed to determine the repeat count, and this count is passed to the fill-in process as indicated by process block 491. Because the repeat count may be defined by a parameter, or an expression containing a parameter, the process block 491 may call expression evaluation routines which form part of the parameter assignment program. After all necessary calculations have been made, a set of instructions indicated by block 492 are executed to output a message to the CRT 17 which displays the name of the canned cycle being executed and the number of times it will be repeated. The command handler then returns to the calling process.

Referring still to FIG. 5, the command handler program 483 also executes instructions indicated by decision block 493 to determine if an "MSG" command mnemonic is present. If so, the parameter "name" characters, the "description" characters and the "units" characters are extracted from the command to form an output message as indicated at block 494. The current value of the indicated parameter is read from the parameter table 16 and a message such as that illustrated in FIG. 25 is output to the CRT 17. It is contemplated that canned cycles will contain comment commands which enable the machine operator to ascertain the current values of those parameters which are required by the canned cycle. If any changes are then required, a parameter assignment command, PAR, can be manually entered through the keyboard 14.

The command handler program 483 also detects the entry of a "PAD" command from the keyboard 14 at a decision block 498. The "PAD" command causes the entire parameter table to be output to the CRT 17 in the format illustrated in FIG. 8. The parameter table 16 is displayed as two columns with twenty parameters on each screen.

The command handler program 483 also processes numerous other commands associated with numerical control systems. This processing is indicated generally by decision block 495 and process block 496. If an invalid command is entered, or the system is not configured to execute a particular command, a suitable error message is displayed on the CRT 17 as indicated by block 497.

PENDENT CONTROL STATION OPERATION

Whereas the programmable interface processor interfaces the numerical control system with the discrete I/O devices on the machine tool, the front panel processor operates the peripheral devices which interface the numerical control system with the operator. As with the programmable interface processor, the front panel processor removes a considerable time burden from the main processor and it allows flexibility in the type and number of peripheral devices which are employed. The front panel processor is an event-driven system which includes an operating system that is comprised of a scheduler routine and a set of monitor service routines. The scheduler portion of the operating system recognizes front panel processor events as they occur and in response to these events it selects tasks to be performed. When more than one task is capable of being executed at any point in time, the task with the highest priority is executed first. A list of such tasks along with their priority is stored in a task queue. For a more detailed description of the pendent control station operation, reference is made to the above-cited U.S. Pat. No. 4,228,495.

APPENDIX A

PARAMETER ASSIGNMENT PROGRAM

```
*
*       ROUTINE TO READ AND PROCESS THE PARAMETERS
*
*       INPUT:   R0 = STRING PTR, AIMED AT "P" CHARACTER
*                AND 'PARBSY' = NON-TYPE II VALUE ('NOTYP2') IF
*                THE CALLER IS NOT PROCESSING TYPE
*                II PART PROGRAM BLOCK.
*       OUTPUT:  R0 = NON-ZERO IF AN ERROR WAS DETECTED
*                ALSO, VALUES ARE STORED IN PARAMETER TABLE
*
PARAM   EQU     $
        MOV     R11,R7          SAVE THE RETURN ADDRESS
        MOV     R15,R6          SAVE POINTER TO BEGINNING OF STRING
        MOV     R0,R15          POINTER TO THE NEXT CHAR IN R15
PM2     MOVB    *R15+,R9        SKIP BLANKS
        CB      R9,@BLANK
        JEQ     PM2
*
        CB      R9,@AS0         SEE IF IT IS A CLEAR PARAMETER
                                TABLE 'PAR,0' COMMAND
        JNE     PM4             NO
*
*       IT'S A 'PAR,0' COMMAND
*
PM3     MOVB    *R15+,R9        SKIP BLANKS
        CB      R9,@BLANK
        JEQ     PM3
*
        CB      R9,R10
        JNE     PMTERR          ERR IF CHAR NOT VALID TERMINATOR:
                                'EOB' OR ")"
        BL      @PARCLR         GO CLEAR THE PARAMETER TABLE
        CLR     R0              CLEAR ERROR CODE
        JMP     PRMXIT          AND TO EXIT
*
*       HERE IF NOT A 'PAR,0' COMMAND
*
PM4     EQU     $
        DEC     R15
        CLR     R0              CLEAR THE ERROR FLAG
PARAM1  MOVB    *R15+,R9        SKIP BLANKS
        CB      R9,@BLANK
        JEQ     PARAM1
*
        CB      R9,@PEE         'P' CHR?
        JNE     PRM2            -NO
        BL      @CPRMNO         CALL ROUTINE TO CALCULATE PARAMETER
                                TABLE ADDRESS
        MOV     @PARERR,R0      TEST FOR ERRORS
        JNE     PMERR           ERROR IF NON-ZERO
        INC     R15             LOOK AT THE NEXT CHAR
        BLWP    @PARVEC         CALL ROUTINE TO EVALUATE PARAMETER
                                EXPRESSION
        MOV     @PARERR,R0      TEST FOR ZEROS
        JNE     PMERR           ERROR IF NON-ZERO
        LI      R14,PARMWP
        MOV     @2(R14),*R4+    GET PARAMETER VALUE AND STORE AT
                                PROPER LOCATION IN PARAMETER TABLE 16
        MOV     @4(R14),*R4+
        MOV     @6(R14),*R4
        SETO    @REPEAT
        JMP     PARAM1          LOOP UNTIL ALL PARAMETERS EVALUATED
*
*       CHARACTER WASN'T A 'P'; SEE IF IT'S A TERMINATOR:
*       'EOB' OR ")"
*
PRM2    EQU     $
        CB      R9,R10          GOOD TERM?
        JEQ     PRMXIT          -YES, EXIT
*
*       HERE IF TERMINATION ERROR
*
PMTERR  EQU     $
        LI      R10,INVTRM      -NO, SET PARM ERROR FLAG
        MOV     R10,@PARERR
*
*       HERE IF ANY ERRORS
*
```

APPENDIX A-continued
PARAMETER ASSIGNMENT PROGRAM

| PMERR | EQU | $ | |
| --- | --- | --- | --- |
|  | MOVB | @PRMERR,R0 | SET ERROR BYTE FOR PP BFR HEADER |
| * | COMMON | EXIT | |
| * | | | |
| PRMXIT | EQU | $ | |
|  | MOV | R6,R15 | RESTORE R15 |
|  | MOVB | R0,@2(R15) | PUT R0 INTO ERROR BYTE IN PP HEADER |
|  | CLR | @PARBSY | MAKE 'PEXEV' IDLE |
|  | BLWP | @OPRT1 | |
|  | DATA | 2*R7 | AND EXIT VIA R7 |

* ••••••••••••••••••••••••••••••••••••••••••••••••••••••••••••••••••••••••••••••••••••••••••••••••••
*
* SUBROUTINE TO CLEAR THE PARAMETER TABLE 16
*

| PARCLR | EQU | $ | |
| --- | --- | --- | --- |
|  | LI | R9,PTBLG | PARAM. TABLE LENGTH |
| PAR1 | DECT | R9 | |
|  | CLR | @PRMTBL(R9) | |
|  | JNE | PAR1 | LOOP UNTIL TABLE IS ZEROED |
|  | MOV | R6,R15 | RESTORE R15 |
|  | SETO | @REPEAT | |
|  | RT | | |

*
* PARDEC: CALLED BY DECODE TO EVALUATE A PARAMETER EXPRESSION
*
*
* MUST PRESERVE R6,R8,R9,R11,R13,R15
*

| PPARDC | EQU | $ | |
| --- | --- | --- | --- |
|  | MOV | @PARBSY,R1 | WAIT UNTIL 'PEXEV' ROUTINE IS IDLE |
|  | JEQ | PARD5 | IS NOT BUSY |
|  | BLWP | @BLOCK | |
|  | DATA | 3 | WAIT 1 COARSE ITERATION |
|  | JMP | PPARDC | |
| PARD5 | MOV | @NOTYP2,@PARBSY | SET 'PEXEV' BUSY = SPECIAL VALUE |
|  | INC | R15 | TO GET PAST 1ST COMMA |
|  | JMP | INTRFC | JMP TO INTERFACE ROUTINE |

••••••••••••••••••••••••••••••••••••••••••••••••••••••••••••••••••••••••••••••••••••••••••••••••••
*
* PARPT1: CALLED TO EVALUATE REPEAT COUNT
*

| PPARP1 | EQU | $ | |
| --- | --- | --- | --- |
|  | MOV | @PARBSY,R1 | WAIT UNTIL 'PEXEV' ROUTINE IS IDLE |
|  | JEQ | PP1A | |
|  | BLWP | @BLOCK | |
|  | DATA | 3 | |
|  | JMP | PPARP1 | |
| PP1A | MOV | @ONEW,@PARBSY | SET 'PEXEV' ROUTINE BUSY = +1 AND |
|  | JMP | INTRFC | JMP TO INTERFACE ROUTINE |

••••••••••••••••••••••••••••••••••••••••••••••••••••••••••••••••••••••••••••••••••••••••••••••••••
*
* INTERFACE ROUTINE:
*
* (1) EVALUATES EXPRESSION
* (2) ADJUSTS RESULTANT VALUE BY IT'S EXPONENT
* (3) LEAVES 2-WORD RESULT IN R1,R2
*

| INTRFC | EQU | $ | |
| --- | --- | --- | --- |
|  | MOV | R11,@PRDR11 | SAVE RETURN ADDRESS |
|  | BLWP | @PARVEC | GO EVALUATE THE PARAMETER EXPRESSION |
|  | MOV | @PARERR,R0 | ANY ERRORS ? |
|  | JNE | PARMER | -YES |
|  | LI | R14,PARMWP | |
|  | MOV | @2(R14),R1 | GET 2-WORD RESULT |
|  | MOV | @4(R14),R2 | |
|  | MOV | @6(R14),R3 | AND IT'S EXPONENT |
|  | C | @PARBSY,@ONEW | FROM REPEAT COUNT ENTRY? |
|  | JEQ | PARD4 | -YES, SKIP A LOT |
| * | | | |
|  | MOV | @CONFMT,R0 | DECIMAL PT. FORMAT ? |
|  | JNE | PARD1 | -NO |
|  | MOV | R13,R5 | GET MAX.DIGITS TO RT. OF DEC.PT.=NDIG |
|  | SZCB | R5,R5 | |
|  | S | R3,R5 | NDIG−E=NE |
| * | | | |
| PARD2 | MOV | R5,R5 | |
|  | JEQ | PARX | ALL DONE IF NE=0 |
|  | JLT | PAR3 | MUST DIVIDE IF NE<0 |
|  | | OR MPY IF NE>0 | |
|  | BL | @GETP10 | PUT POWER OF 10 INTO R3,R4 |

APPENDIX A-continued
PARAMETER ASSIGNMENT PROGRAM

|  |  |  |  |
|---|---|---|---|
|  | MOV | R6,R0 | SAVE R6 |
|  | BL | @DDSMPY | PERFORM DBL WORD MPY |
|  | MOV | R0,R6 | RESTORE R6 |
|  | CLR | R12 | TO PREVENT DIVISION |
|  | BL | @REDUCE | REDUCE TO 2-WDS |
|  | JNE | PAROVR | ERROR-GOT AN OVERFLOW! |
| PARX | SZC | R0,R0 | CLEAR ERROR FLAG |
| PARXX | MOV | @PRDR11,R11 | RESTORE RETURN ADDRESS |
|  | MOV | R0,R0 | SET UP STATUS REGISTER |
|  | CLR | @PARBSY | MAKE 'PEXEV'RTN IDLE |
|  | B | @OPTX | OPTION RETURN |
| PARD1 | EQU | $ | HERE IF NOT DECIMAL POINT FORMAT |
|  | MOV | R3,R5 | EXPONENT=E |
|  | NEG | R5 | NE=−E |
|  | MOV | R0,R0 | WHAT KIND OF ZERO SUPPRESSION ? |
|  | JLT | PARD2 | -LEADING; MUST DIVIDE RESULT |
|  | LI | R0,TRAILZ | -TRAILING; PUNT |
| PARMER | MOVB | @PRMERR,@DERR(R9) | SET ERROR CODE FOR WARNING MESSAGE |
|  | MOV | R0,@PARERR | SET ERROR FLAG |
|  | JMP | PARXX | AND EXIT |
| PAROVR | LI | R0,OVRFLO | FINAL CONVERSION OVERFLOW ERROR |
|  | JMP | PARMER |  |
| PARD4 | EQU | $ | HERE IF FROM PATTERN REPEAT |
|  | MOV | R3,R5 |  |
|  | JEQ | PARX | EXIT IF EXPONENT=0 |
| PAR3 | EQU | $ | HERE TO DIVIDE |
|  | ABS | R5 |  |
|  | MOV | R5,@10(R14) | PUT NE INTO PARAM WORKSPACE |
|  | LWPI | PARMWP | LET'S GET INTO PARAM's WKSP |
|  | LI | R9,ARGSTK | ADDR OF 'ARG' STACK |
|  | MOV | R1,*R9 | MAKE ARG1=OLD RESULT |
|  | MOV | R2,@2(R9) |  |
|  | MOV | R5,@4(R9) | DON'T FORGET THE EXPONENT |
|  | BL | @GETP10 | PUT POWER OF 10 INTO R3,R4 |
|  | MOV | R3,R1 | SET ARG2 = POWER OF 10 |
|  | MOV | R4,R2 |  |
|  | CLR | R3 | AGR2's EXPONENT = 0 |
|  | CLR | R8 | FLAG FOR 'DIV' ROUTINE |
|  | B | @DIV | TO 'DIV' ROUTINE |
| PAR3A | EQU | $ | RETURN FROM 'DIV' ROUTINE |
|  | LWPI | CYCWP | RESTORE CYCLE WP |
|  | MOV | @2(R14),R1 | GET FINAL RESULT |
|  | MOV | @4(R14),R2 |  |
|  | MOV | *R14,R3 | FOR RC EVAL: R3 NOT=0 SAYS RC WAS NEGATIVE |
|  | JMP | PARX | TO EXIT |
| * | PEXEV: PARAMETER EXPRESSION EVALUATION --- USED FOR ALL PARA- | | |
| * | METER EXPRESSIONS REGARDLESS OF ENTRY POINT | | |
| * | CALL: | BLWP | @PARVEC |
| * |  | OUTPUTS: | R1,R2,R3=VALUE OF EXPRESSION, WHERE |
|  |  |  | R1,R2=DOUBLE PRECISION VALUE AND R3= |
|  |  |  | LOCATES DECIMAL POINT |
| PEXEV | EQU | $ |  |
|  |  |  | INITIALIZATION |
|  | MOV | R13,@CALRWP | SAVE CALLER'S WP |
|  | MOV | R14,@CALRPC | AND HIS PC |
|  | MOV | @30(R13),R15 | GET PTR TO EXPRESSION STRING |
| * | ONE-TIME CALCULATIONS | | |
|  | STWP | R13 |  |
|  | AI | R13,12 |  |
|  | MOV | R13,@PR6 | SAVE ADDR OF R6 |
|  | AI | R13,14 |  |
|  | MOV | R13,@PR13 | SAVE ADDR OF R13 |
|  | LI | R10,OPTOP | POINTER TO TOP OF 'OP' STACK |
|  | LI | R9,ARGTOP | POINTER TO TOP OF 'ARG' STACK |
|  | LI | R8,PRETOP | POINTER TO TOP OF 'PREV' STACK |
|  | CLR | @PARERR | CLEAR ERROR FLAG |
|  | LI | R0,LPARN | INITIALIZE 'PREV' TO '(' |

APPENDIX A-continued
PARAMETER ASSIGNMENT PROGRAM

```
           BL       @PSHPRE
*
A1         EQU      $
           MOVB     *R15+,R7              GET NEXT CHR
           CB       R7,@SPAC              SPACE ?
           JEQ      A1                    -YES
           CB       R7,@OPARN             ( ?
           JEQ      OPRN                  -YES
           BL       @IDARGU               GO IDENTIFY/DECODE ARGUMENT-IF ANY.
           MOV      @PARERR,R0
           JNE      A3                    SKIP IF ERROR
           BL       @PROCOM               GO PROCESS COMPONENT
           JMP      A1                    NOT AT END SO LOOP
A3         B        @COMERR               TO ERROR PROCESSING
*
*          HERE IF CHR IS '('
*OPRN      EQU      $
           LI       R0,LPARN              IMPLIES PREV = '('
           BL       @PSHPRE               GO PUSH PREV
           JMP      A1                    LOOP
*
*          IDARGU:  A SUBROUTINE TO IDENTIFY AND DECODE ARGUMENT
*
*          PURPOSE: TO DETERMINE IF COMPONENT IS AN ARGUMENT. IF IT
*                   IS, THEN DETERMINE THE ARGUMENT TYPE (PARAMETER
*                   OR CONSTANT) AND COMPUTE THE VALUE OF THE ARGUMENT.
*
*          INPUTS:  R7=EXPRESSION CHR.
*                   R15=PTR TO ASCII STRING (1ST CHR OF COMPONENT)
*
*          OUTPUTS: R1,R2,R3=ARGUMENT VALUE
*                   R7='A' IF COMPONENT IS AN ARGUMENT
*                   R15=PTR TO ASCII STRING (1ST CHR PAST END OF ARGUMENT)
*
IDARGU     EQU      $
           MOV      R11,@IDR11            SAVE RETURN ADDRESS
           CB       R7,@PARMCH            PARAMETER CHR ?
           JEQ      PRAM                  -YES
           CB       R7,@DECPT             '.' ?
           JEQ      CON                   -YES
           CB       R7,@ZERO              LESS THAN 0 ?
           JL       IDAX                  -YES
           CB       R7,@NINER             LESS THAN OR EQUAL TO 9 ?
           JLE      CON                   -YES
           JMP      IDAX                  -NO, COMPONENT IS NOT AN ARGUMENT
*
CON        EQU      $                     HERE IF ARGUMENT = A CONSTANT; CONVERT IT
                                          TO BINARY
*
           DEC      R15
           BL       @CATBI                CONVERT TO INTEGER BINARY
           JMP      IDA1                  DONE; GO SET ARGUMENT CODE
*
PRAM       EQU      $                     HERE IF ARGUMENT = A PARAMETER
*
           BL       @CPRMNO               CONVERT PRAM # INTO PARAM TABLE ADDRESS
           MOV      *R4+,R1               PUT PARAMETER VALUE FROM TABLE 16
                                          INTO R1,R2,R3
           MOV      *R4+,R2
           MOV      *R4,R3
IDA1       MOVB     @ARGUCH,R7            SET CHR = ARGUMENT CODE
IDAX       EQU      $                     END OF ID/DECODE ARGUMENT
*
           MOV      @IDR11,R11            RESTORE RETURN
           RT                             EXIT
*
*          CPRMNO:  SUBROUTINE TO CONVERT PARAMETER NUMBER TO A BINARY
*                   NUMBER AND TO COMPUTE THE ADDRESS OF THAT PARAMETER'S
*                   ENTRY INTO THE PARAMETER TABLE 16
*
*          REGISTERS USED: R0-R5, R11-R15;
*
*          INPUT:   R15=POINTER TO CHR FOLLOWING 'P'
*          OUTPUT:  R0=PARAM. NO. AND R4=PARAMETER TABLE ADDRESS
*                   ALSO, IF 'PARERR' IS NON-ZERO AN ERROR HAS OCCURRED.
*
*          NOTE: THIS SUBROUTINE MAY ALSO BE CALLED BY
*                THE "DEFINE PARAMETER" TASK ('PAR')
*
CPRMNO     EQU      $
           MOV      R11,@CPNR11           SAVE RETURN ADDRESS
```

APPENDIX A-continued

PARAMETER ASSIGNMENT PROGRAM

```
            CLR     @PARERR             CLEAR ERROR FLAG
            SETO    R14                 =LEADING ZERO SUPPRESSION ARGUMENT
            LI      R13,>0200           DIGITS(+1) IN PARAM. NO.
            BL      @CATB               CONVERT PARM. NO.
            MOV     R1,R1
            JNE     CPER                ERROR IF MS WORD IS NOT ZERO,
            CI      R2,PARMNO           .. OR IF LS WORD EXCEEDS MAX. NO.,
            JH      CPER
            MOV     R2,R2               .. OR IF IT = 0.
            JNE     CP1
CPER        LI      R0, INVPNO          INVALID PARAM NUMBER
            MOV     R0,@PARERR
            JMP     CP2                 AND EXIT
*
CP1         EQU     $                   NOW COMPUTE PARAMETER TABLE POINTER
*
            MOV     R2,R0               SAVE PARAMETER #
            MOV     R2,R3
            DEC     R3                  (PARAM #)-1
            LI      R5,NTRYLG           ENTRY LGT.
            MPY     R5,R3               OFFSET=(ENTRY LGT)*(PARAM # -1)
            AI      R4,PRMTBL           R4=PTR = ADDRESS INTO PARAM. TABLE
CP2         MOV     @CPNR11,R11         RESTORE RETURN ADDRESS
            RT                          EXIT
*
*           PROCOM: A SUBROUTINE TO PROCESS COMPONENTS.
*                   IT DOES THAT BY PROCESSING APPROPRIATE SUB-TABLE
*                   OF PROCESS TABLE TO MATCH EXPRESSION CHARACTER WITH
*                   TABLE CHARACTER, THEN TO PERFORM ASSOCIATED ACTION.
*
*           INPUT:  R7=EXPRESSION CHARACTER
*                   R8='PREV' POINTER
*
PROCOM      EQU     $
            MOV     R11,@PCR11          SAVE RETURN ADDRESS
REPRO       EQU     $                   HERE TO RE-PROCESS
            MOV     *R8,R4              GET TABLE POINTER (FROM 'PREV')
*
PLOOP       MOV     *R4+,R5             GET NEXT TABLE CHR
            JEQ     PERR                ERROR IF AT END OF SUB-TABLE
            CB      R7,R5               DO CHR MATCH ?
            JNE     PLOOP               -NO,LOOP
            ANDI    R5,>00FF            -YES. GET ACTION NUMBER
            MOV     @ACTLST(R5),R4      COMPUTE ADDRESS OF ACTION #
            B       *R4                 GO PERFORM ACTION
*
RTN         EQU     $                   RETURN POINT FROM ALL ACTIONS
            MOV     @PCR11,R11          RESTORE RET. ADDR.
            RT                          EXIT
*
PERR        LI      R0,NOMTCH           ERROR-NO MATCH
*
*           HERE FOR ALL ERRORS DETECTED WITH R0=ERROR CODE
*
COMERR      MOV     R0,@PARERR          STORE ERROR CODE
            JMP     EXIT                TO 'PEXEV' EXIT
*
*           ACTION ROUTINES
*
*************************************************************************
*
ACT0        JMP     RTN                 A DO-NOTHING ACTION
*
*************
*
ACT2        EQU     $
            LI      R0,SOP              PUSH "SPEC OP" INTO 'PREV'
            BL      @PSHPRE
*           PUSH EXPRESSION CHR (IN R7) INTO 'OP' STACK
*
PUSHOP      EQU     $
            INC     R10                 PUSH 'OP'
            CI      R10,OPBOT           IF PTR EXCEEDS MAX
            JH      A2ERR               IT'S AN ERROR
            MOVB    R7,*R10             STORE THE DATA
            JMP     RTN                 RETURN
*
A2ERR       LI      R0,OPOVER           ERROR-'OP' STACK OVERFLOW
            JMP     COMERR
*
```

APPENDIX A-continued
PARAMETER ASSIGNMENT PROGRAM

```
**************
*
ACT 4       EQU     $
            LI      R0,OP                       PUSH "OP" INTO 'PREV'
            BL      @PSHPRE
            JMP     PUSHOP                      GO PUSH 'OP' STACK
*
**************
*
ACT6        EQU     $
            LI      R0,ARG                      PUSH "ARG" INTO 'PREV'
            BL      @SHPRE
*           PUSH 'ARG' STACK (ARGUMENT IN R1,R2,R3)
*
            A       @SIXW,R9                    PUSH 'ARG'
            CI      R9,ARGBOT                   IF PTR IS BELOW BOTTOM OF STACK
            JHE     A6ER                        IT'S AN ERROR
            MOV     R1,*R9                      STORE THE ARGUMENT
            MOV     R2,@2(R9)
            MOV     R3,@4(R9)
            JMP     RTN                         RETURN
A6ER        LI      R0,ARGOVR                   ERROR-'ARG' STACK OVERFLOW
            JMP     COMERR
*
**************    HERE IF AT END OF EXPRESSION (COMMA OR '#' FOUND)
*
ACT14       EQU     $
            CB      R7,@COMMA                   IF COMMA,
            JEQ     A14A                        SKIP
            DEC     R15                         ELSE ADJUST STRING POINTER
A14A        CI      R8,PREEND                   CHECK FOR VALID STACK POINTERS
            JNE     ENDERR
            CI      R9,ARGSTK
            JNE     ENDERR
            CI      R10,OPTOP
            JNE     ENDERR
*
*           EXIT FROM "EXPRESSION EVALUATION" SUBROUTINE
*
EXIT        EQU     $
            MOV     @CALRWP,R13
            MOV     @CALRPC,R14
            MOV     R15,@30(R13)                RESTORE UPDATED STRING PTR
            LI      R15,STAT
            RTWP                                RETURN TO CALLER
*
ACT8        EQU     $
            C       @PARBSY,@NOTYP2             IS THIS PART OF A TYPE II CMD?
            JEQ     ACT8A                       -NO; THEN DON'T WORRY ABOUT NEXT CHR
            CB      *R15,@EOB                   -YES; IS NEXT CHR = 'EOB' ?
            JEQ     ACT14                       -YES; THEN END OF EXPRESSION
ACT8A       EQU     $
            BL      @POPARG                     GO POP 'ARG' STACK POINTER
            MOV     *R4,R1                      GET THE ARGUMENT THAT
            MOV     @2(R4),R2                   WAS IN THE
            MOV     @4(R4),R3                   'ARG' STACK
            JMP     A12A                        CONTINUED BELOW
*
**************
*
ACT10       EQU     $
            BL      @EVAL1A                     EVALUATE SINGLE ARGU. EXP.
            JMP     ACTCOM
*
**************
*
ACT 12      EQU     $
            BL      @EVAL2A                     EVALUATE 2 ARGU. EXP.
A12A        BL      @POPREV                     POP 'PREV' STACK (HERE ALSO FROM ACT. 8)
*           HERE TO POP 'PREV' STACK & TO SET EXP CHR='A'
*
ACTCOM      EQU     $
            BL      @POPREV                     POP 'PREV' STACK
            MOVB    @ARGUCH,R7                  SET EXP CHR='A'
            JMP     REPRO                       RE-PROCESS TABLE
*
*
*           SUBROUTINES
*
****************************************************************************************
*
```

APPENDIX A-continued
PARAMETER ASSIGNMENT PROGRAM

```
*
*
*         PUSH 'PREV' STACK (DATA IN R0)
*
PSHPRE    EQU     $
          INCT    R8                      PUSH 'PREV' STACK
          CI      R8,PREBOT               STILL INSIDE STACK?
          JHE     PSHPER                  -NO,ERROR
          MOV     R0,*R8                  PUSH THE DATA

RT                              EXIT
PSHPER    LI      R0,PREOVR               ERROR-'PREV' STACK OVERFLOW
          JMP     COMERR
*
**************
*
*         POP 'PREV' STACK
*
POPREV    EQU     $
          DECT    R8                      POP THE STACK
          CI      R8,PRETOP               STILL IN STACK?
          JHE     RET                     YES, EXIT
          LI      R0,PREUND               ERROR-'PREV' STACK UNDERFLOW
          JMP     COMERR
*
**************
*
*         POP 'OP' STACK INTO R0
*
POPOP     EQU     $
          MOVB    *R10,R0                 GET OPERATOR
          DEC     R10                     POP 'OP'
          CI      R10,OPTOP               STILL INSIDE STACK?
          JHE     RET                     -YES, EXIT
          LI      R0,OPUNDR               ERROR-'OP' STACK UNDERFLOW
          JMP     COMERR
*
ENDERR    LI      R0,BADEND               ERROR-BAD ENDING
          JMP     COMERR
*
*         POP 'ARG' STACK POINTER (WITH ORIGINAL POINTER LEFT IN R4)
*
POPAGR    EQU     $
          MOV     R9,R4                   SAVE ORIGINAL POINTER
          S       @SIXW,R9                POP THE 'ARG'STACK
          CI      R9,ARGTOP               STILL INSIDE STACK?
          JHE     RET                     -YES, EXIT
          LI      R0,ARGUND               ERROR-'ARG'STACK UNDERFLOW
          JMP     COMERR
RET       RT                              SUBROUTINES EXIT
*
****  PROCESS TABLE  **************************************************************
*
*         EACH ENTRY HAS 2 BYTES:
*         1ST BYTE = ASCII CHR TO COMPARE WITH CURRENT CHR
*         2ND BYTE = ACTION #
*         THERE ARE 4 SUB-TABLES, EACH ONE ASSOCIATED WITH THE PREVIOUS
*         CHR
*
LPARN     BYTE    '-',2
          BYTE    'V',2                   'V' IS CHR FOR SQUARE ROOT OPERATOR
          BYTE    'A',6                   'A' IS CHR FOR ARGUMENT COMPONENT
          BYTE    '+',0
          DATA    0                       END OF SUB-TABLE ENTRY
ARG       BYTE    '/',4
          BYTE    '+',4
          BYTE    '-',4
          BYTE    '*',4                   '*' IS CHR FOR MULTIPLY OPERATOR
          BYTE    'x',4                   'x' IS ALSO A MPY OPERATOR
          BYTE    ')',8
          BYTE    ',',14                  END OF EXPRESSION CHR IS COMMA
          BYTE    >0A,14                  OR AN 'EOB' ('#')
          DATA    0
OP        BYTE    '-',2
          BYTE    'V',2
          BYTE    'A',12
          BYTE    '+',0
          DATA    0
SOP       BYTE    '-',2
          BYTE    'V',2
          BYTE    'A',10
```

APPENDIX A-continued

PARAMETER ASSIGNMENT PROGRAM

```
              BYTE '+',0
              DATA 0
***   END OF PROCESS TABLE  ***********************************************************
*             ACTION ADDRESS LIST
*
ACTLST        DATA ACT0
              DATA ACT2
              DATA ACT4
              DATA ACT6
              DATA ACT8
              DATA ACT10
              DATA ACT12
              DATA ACT14
*                                        END OF ACTLST
*
PARVEC  DATA PARMWP,PEXEV                CALLING VECTOR
PARMCH  BYTE 'P'                         VALUE OF PARAMETER CHARACTER
ARGUCH  BYTE 'A'                         VALUE OF ARGUMENT CODE
DECPT   BYTE '.'
ZERO    BYTE '0'
NINER   BYTE '9'
EX      BYTE 'x'
*
*
              END
```

COMPONENT APPENDIX

| Reference Number | Manufacturer and Model No. | Description |
|---|---|---|
| 25 | Texas Instruments, Inc. TMS 9900 | 16-bit microprocessor. |
| 29 | MOSTEK MK4104 | 4K × 1 Random Access Memory. |
| 30 | Signetics 82S181 | 1K × 8 Programmable Read-Only Memory |
| 37 | AMD 9551-4 | Universal Synchronous/Asynchronous Receiver/Transmitter. |
| 45 | Texas Instruments, Inc. TMS 9901 | Interrupt Controller. |
| 53, 54 | Texas Instruments, Inc. 74LS138 | 3-line-to-8-line decoder. |
| 220 | Texas Instruments, Inc. TMS 9902 | Universal Asynchronous Receiver/Transmitter. |
| 221 | Texas Instruments, Inc. TMS 9900 | 16-bit Microprocessor. |
| 224 | Intel 2732 | 4K × 8 Programmable Read-Only Memory. |
| 225 | General Instrument ER3401 | 1K × 4 Electrically Alterable Read-Only Memory |
| 226 | Intel 2114 | 1K × 4 Random Access Memory. |
| 236 | Texas Instruments, Inc. 74LS374 | Octal Register. |
| 251 | National Semiconductor DP8304 | Octal Transceiver. |
| 252 | Standard Microsystems Corp. CRT5027 | CRT Timing and Controller. |
| 260 | Texas Instruments, Inc. 74LS139 | 2-line-to-4-line Decoder. |
| 269 | Texas Instruments, Inc. 74LS244 | Tristate Buffer. |
| 274, 275, 276 | Texas Instruments, Inc. 74LS374 | Octal Register. |
| 277 | Texas Instruments, Inc. 74LS138 | 3-line-to-8-line Decoder. |
| 285 | Texas Instruments, Inc. TMS 9901 | Interrupt Control. |
| 294 | Texas Instruments, Inc. TMS 9902 | Universal Asynchronous Receiver/Transmitter. |
| 306 | Texas Instruments, Inc. 74LS244 | Tristate Buffer. |
| 325 | Texas Instruments, Inc. 74LS123 | Monostable Multivibrator. |
| 336 | Texas Instruments, Inc. 74LS138 | 3-line-to-8-line Decoder. |
| 338-341 | Texas Instruments, Inc. 74LS259 | 8-bit Addressable Latch. |
| 351-354 | Texas Instruments, Inc. 74LS138 | 3-line-to-8-line Decoder. |

We claim:

1. A numerical control system for directing a machine tool to machine a part which comprises:

means for storing a part program comprises of a first set of part program instructions;

processor means coupled to the part program storage means and being operable to execute the part program instructions to thereby direct the machining of a part;

means coupled to the processor for storing a macroprogram comprised of a second set of part program instructions containing parameters;

parameter table storage means coupled to the processor means for storing a set of parameter values;

wherein the processor means includes, (a) parameter assignment means which interprets parameter assignment codes in part program instructions of either said first or second sets and which operates in response to such codes to designate a parameter and to store a value for the designated parameter in said parameter table storage means, (b) macroprogram execution means which interprets macro call instructions in the first set of part program instructions to execute the second set of part program instructions as the part defined by the sets of part program instructions is being machined, and (c) parameter evaluation means which is responsive to a parameter contained in a part program instruction of either the first or second sets being executed by the processor means to read the value for that parameter from the parameter table storage means and substitute it for said parameter in said part program instruction as the part program instruction is being executed to machine a part.

2. The numerical control system as recited in claim 1 which includes manual data entry means coupled to said processor means, and said parameter assignment means is also responsive to a parameter assignment command which designates a parameter and the value of the designated parameter and which is entered through said manual data entry means as the part program instruction sets are being executed by the processor means to store the value for the designated parameter in said parameter table storage means.

3. The numerical control system as recited in claim 1 in which said part program instructions contain expression elements comprised of parameters and constants interrelated to each other by arithmetic operators, and said processor means includes expression element evaluation means which is responsive to expression elements contained in part program instructions being executed to read the values of parameters contained in the expression element from said parameter table storage means, to calculate the value of the expression element, and to substitute the calculated value for the expression element in the part program instruction being executed.

4. The numerical control system as recited in claim 1 in which the macro call instructions each include a repeat count code and the macroprogram execution means is responsive to the repeat count code to repeat the execution of the second set of part program instructions the number of times indicated by this code.

5. A numerical control system for directing a machine tool to machine a part which comprises:
   means for storing a part program comprised of a set of part program instructions;
   processor means coupled to the part program storage means and being operable to execute the part program instructions and to thereby direct the machining of a part;
   display means coupled to the processor means and being operable to provide a visual display of alpha numeric data received from the processor means;
   parameter table storage means coupled to the processor means for storing a set of parameter values;
   wherein the processor means includes,
   (a) parameter assignment means which interprets parameter assignment codes in part program instructions and which operates to designate a parameter and store a value for the designated parameter in said parameter table storage means,
   (b) parameter evaluation means which is responsive to a parameter contained in a part program instruction being executed by the processor means to read the value for that parameter from the parameter table storage means and substitute it for said parameter in said part program instruction as the part program instruction is being executed to machine a part, and
   (c) command handler means which interprets message display codes in part program instructions and which operates to read the value of a parameter designated by the message display code from the parameter table storage means and to output the designated parameter and its value to the display means.

6. The numerical control system as recited in claim 5 which includes manual data entry means coupled to said processor means, and said parameter assignment means is also responsive to a parameter assignment command which designates a parameter and the value of the designated parameter, and which is entered through said manual data entry means as the part program is being executed by the processor means and is stored in the parameter table storage means,
   wherein the values of parameters may be displayed to a machine operator as the part program is being executed and the values of parameters may be manually changed by the operator during the execution of the part program.

* * * * *